United States Patent [19]

Sugiura et al.

[11] Patent Number: 5,581,665
[45] Date of Patent: Dec. 3, 1996

[54] THREE-DIMENSIONAL OBJECT MOVEMENT AND TRANSFORMATION PROCESSING APPARATUS FOR PERFORMING MOVEMENT AND TRANSFORMATION OF AN OBJECT IN A THREE-DIAMENSIONAL SPACE

[75] Inventors: Masataka Sugiura, Tokyo; Tetsuya Yoshimura; Yasuhiro Nakamura, both of Kawasaki, all of Japan

[73] Assignee: Matsushita Electric Industrial Co., Ltd., Osaka, Japan

[21] Appl. No.: 141,001

[22] Filed: Oct. 26, 1993

[30] Foreign Application Priority Data

Oct. 27, 1992 [JP] Japan .................................. 4-288491

[51] Int. Cl.[6] .............................. G05B 19/04; G06K 9/32
[52] U.S. Cl. .............................. 395/86; 395/80; 395/119; 395/137; 395/138; 395/139; 382/295; 382/296; 382/298; 382/153; 382/154
[58] Field of Search .................................. 395/80, 86, 97, 395/119, 137, 138, 139; 382/44, 47, 293, 298, 153, 154, 295, 296

[56] References Cited

U.S. PATENT DOCUMENTS 5,263,135  11/1993  Dei ......................................... 395/163

FOREIGN PATENT DOCUMENTS 2-235180  9/1990  Japan .

OTHER PUBLICATIONS

"Snap–Dragging in Three Dimentions" by Eric A. Bier: pp., 193–204.

Primary Examiner—Raymond J. Bayerl
Assistant Examiner—A. Katbab
Attorney, Agent, or Firm—Lowe, Price, LeBlanc & Becker

[57] ABSTRACT

A three-dimensional object movement and transformation processing apparatus has a shape storing section for storing shapes of a plurality of three-dimensional objects, an affine matrix calculating section for calculating transformation affine matrices Mow indicating movement or transformation of the objects from shape prescription coordinate systems prescribing the shapes of the objects to a world coordinate system, an inverse matrix calculating section for calculating inverse matrices Mwo of the matrices Mow indicating movement or transformation of the objects from the world coordinate system to the shape prescription coordinate systems, and an inter-object processing section for changing shapes of a pair of objects overlapping with each other to processed shapes according to the matrices Mwo and Mow of the second objects to reflect an overlapping condition in the processed shapes. When movement data of a first object is input, matrices Mow and Mwo for the first object are renewed in the calculating sections, and shapes of the first object and a second object overlapping with the first object are renewed in the processing section and the storing section.

19 Claims, 9 Drawing Sheets

THREE-DIMENSIONAL OBJECT MOVEMENT AND TRANSFORMATION PROCESSING APPARATUS FOR PERFORMING MOVEMENT AND TRANSFORMATION OF AN OBJECT IN A THREE-DIAMENSIONAL SPACE

BACKGROUND OF THE INVENTION

1. Field of the Invention

The present invention relates to a three-dimensional object movement and transformation processing apparatus in which movement and transformation of an object required for picture processing and robot control are performed in a three-dimensional space with an inverse matrix calculating apparatus.

2. Description of the Related Art 2.1. Previously Proposed Art

FIG. 1 schematically shows an operating system for operating a three-dimensional object movement processing apparatus conventionally utilized.

As shown in FIG. 1, an operating system 11 comprises a graphical work station 12 having a conventional three-dimensional object movement processing apparatus for generating computer graphic pictures in a virtual three-dimensional space at high speed, a display apparatus 13 for displaying the computer graphic pictures, and an input unit 14 such as a mouse or a key board for inputting an instruction of a user to operate the conventional three-dimensional object movement processing apparatus in which an object is moved in the virtual three-dimensional space according to the user's instruction.

FIG. 2 shows objects 21a, 21b displayed in the display apparatus 13. As shown in FIG. 2, a shape of the object 21a is prescribed in a shape prescription coordinate system $Co_1$, and a shape of the object 21b is prescribed in another shape prescription coordinate system $Co_2$. That is, each of the object shapes is prescribed in the shape prescription coordinate system $Co_1$ or $Co_2$, and a position of the object 21a or 21b in the shape prescription coordinate system $Co_1$ or $Co_2$ is unchanged even though the object is moved. In other words, the shape prescription coordinate systems $Co_1$, $Co_2$ are moved with the objects 21a, 21b in one-to-one correspondence. Also, the shapes of the objects 21a, 21b are prescribed in a world coordinate system Cw in common, and the world coordinate system Cw is unchangeable even though the objects 21a, 21b are moved.

In the conventional three-dimensional object movement processing apparatus, various pieces of three-dimensional spatial object data of the objects are stored. For example, a transformation matrix Mow is included as one of the data to transform a shape prescription coordinate system Co prescribing a shape of an object to the world coordinate system Cw to prescribe a shape of the object in the world coordinate system Cw. Also, a position vector Po of the object prescribed in the shape prescription coordinate system Co is included in the three-dimensional spatial object data. To obtain a position vector Pw of the object prescribed in the world coordinate system Cw, an equation (1) is applied.

$$Pw = Po\ Mow \qquad (1)$$

Also, in cases where a pair of objects are processed while relating to each other, not only the transformation matrix Mow transforming the shape prescription coordinate system Co to the world coordinate system Cw but also another transformation matrix Mwo transforming the world coordinate system Cw to the shape prescription coordinate system Co are required. Specifically, as shown in FIG. 3, in cases where a pair of rectangular planes 31a, 31b arranged in the virtual three-dimensional space are cut along a crossed line 32 of those rectangular planes 31a, 31b, shapes of the rectangular planes 31a, 31b prescribed in shape prescription coordinate systems $Co_1$, $Co_2$ are transformed to shapes of the rectangular planes 31a, 31b prescribed in the same world coordinate system Cw by utilizing transformation matrices $Mo_1w$, $Mo_2w$. Thereafter, the crossed line 32 prescribed in the world coordinate system Cw is obtained. Thereafter, the crossed line 32 prescribed in the world coordinate system Cw is transformed to the crossed line 32 prescribed in the shape prescription coordinate systems $Co_1$, $Co_2$ by utilizing transformation matrices $Mwo_1$, $Mwo_2$. Thereafter, the rectangular plane 31a is cut along the crossed line 32 prescribed in the shape prescription coordinate system $Co_1$, and the rectangular plane 31b is cut along the crossed line 32 prescribed in the shape prescription coordinate system $Co_2$.

Accordingly, two types of transformation matrices Mow, Mwo are required in cases where a plurality of objects are processed while relating to each other.

Next, a moving process in which a parallel translation and a rotational motion is given to an object is described.

When a parallel translation and a rotational motion is performed to move an object, a shape prescribing coordinate system Co prescribing a shape of the object is also moved with the object to keep an unchangeable positional relationship between the object and the shape prescribing coordinate system Co. In contrast, the world coordinate system Cw is unchangeable even though the object is moved. Therefore, the transformation matrices Mow, Mwo of the object are required to be changed to transformation matrices Mow(new), Mwo(new) when the object is moved.

FIG. 4 is a constitutional block diagram of a conventional three-dimensional object movement processing apparatus.

As shown in FIG. 4, a conventional three-dimensional object movement processing apparatus 41 is provided with a shape storing section 42 for storing pieces of shape data of a plurality of objects respectively prescribed in a particular shape prescription coordinate system Co ($Co_1$, $Co_2$, ...) in a virtual three-dimensional space, a Mow transformation matrix storing section 43 for storing a plurality of transformation matrices Mow transforming the shape prescription coordinate system Co prescribing the shape data of the objects to the world coordinate system Cw to prescribe the shape data in the world coordinate system Cw, and a Mwo transformation matrix storing section 44 for storing a plurality of transformation matrices Mwo transforming the world coordinate system Cw to the shape prescription coordinate system Co to prescribe the shape data of the object in the system Co.

The apparatus 41 is further provided with the input unit 14 for inputting a piece of movement data designating a parallel translation amount and a rotational motion amount of an object and inputting a piece of inter-object processing data to process a plurality of objects relating to each other, an input data judging section 45 for judging whether the input data given to the input unit 14 is either the movement data or the inter-object processing data, a movement matrix generating section 46 for generating transformation matrices Mwm, Mmw between the world coordinate system Cw and a movement coordinate system Cm prescribing the movement of the object and movement matrices Mm, Mm' indicating the movement of the object in the movement coordinate system Cm in cases where it is judged in the input data judging section 45 that the movement data is input to the input unit 14, and an affine matrix calculating section 47 for multiplying affine matrices represented by the transformation matrices Mow, Mwo stored in the Mow and Mwo transformation matrix storing sections 43, 44 and the matrices Mm, Mm', Mwm, Mmw generated in the movement matrix generating section 46 to newly produce transformation matrices Mow(new), Mwo(new) relating to the object moved and rotated. The transformation matrices Mow(new), Mwo(new) produced are stored in the Mow and Mwo transformation matrix storing sections 43, 44 to replace the matrices Mow, Mwo with the matrices Mow(new), Mwo(new).

The apparatus 41 is further provided with an inter-object processing section 48 for processing a plurality of objects relating to each other by utilizing the shape data of the objects stored in the shape storing section 42 and the transformation matrices Mow, Mwo stored in the Mow and Mwo transformation matrix storing sections 43, 44 in cases where it is judged in the input data judging section 45 that the inter-object processing data is input to the input unit 14, a picture drawing section 49 for drawing shapes of the objects prescribed in the common world coordinate system Cw by utilizing the shape data of the objects stored in the shape storing section 42 and the transformation matrix Mow stored in the Mow transformation matrix storing section 43, and the display 13 for displaying the shapes of the objects drawn in the picture drawing section 49.

In the above configuration, in cases where the inter-object processing data is input to the input unit 14 to process a plurality of objects relating to each other, the objects are processed in the inter-object processing section 48. Therefore, the objects are, for example, cut along the crossed line 32, as is described above. Thereafter, the shape data of the objects stored in the shape storing section 42 are replaced with pieces of shape data newly obtained in the inter-object processing section 48.

In cases where the movement data is input to the input unit 14 to move an object from a first point to a second point, transformation matrices Mow, Mwo of the object stored in the Mow and Mwo transformation matrix storing sections 43, 44 are changed to transformation matrices Mow(new), Mwo(new). Here, the transformation matrices Mow, Mwo relate to the object positioned at the first point, and the transformation matrices Mow(new), Mwo(new) relate to the object positioned at the second point. The change of the transformation matrix Mow to the transformation matrix Mow(new) is performed in the affine matrix calculating section 47 according to equation (2).

$$Mow(new)=MowMwmMmMmw \qquad (2)$$

In detail, the shape prescribing coordinate system Co prescribing the shape of the object is transformed to the world coordinate system Cw by the transformation matrix Mow. Thereafter, the world coordinate system Cw is transformed to the movement coordinate system Cm by the transformation matrix Mwm. Thereafter, the object is moved in the movement coordinate system Cm according to the movement matrix Mm. The movement coordinate system Cm and the movement matrix Mm are determined in dependence on the movement data. Thereafter, the movement coordinate system Cm is transformed to the world coordinate system Cw by the transformation matrix Mmw. Therefore, the transformation matrix Mow(new) relating to the subject positioned at the second point is determined.

Also, the change of the transformation matrix Mwo to the transformation matrix Mwo(new) is performed in the affine matrix calculating section 47 according to equation (3).

$$Mwo(new)=MwmMm'MmwMwo \qquad (3)$$

In detail, the world coordinate system Cw is transformed to the movement coordinate system Cm by the transformation matrix Mwm. Thereafter, the object is moved in the movement coordinate system Cm according to the movement matrix Mm'. The movement indicated by the movement matrix Mm' is opposite to the movement indicated by the movement matrix Mm. Thereafter, the movement coordinate system Cm is transformed to the world coordinate system Cw by the transformation matrix Mmw. Thereafter, the world coordinate system Cw is transformed to the shape prescribing coordinate system Co prescribing the shape of the object by the transformation matrix Mwo. Therefore, the transformation matrix Mwo(new) relating to the subject positioned at the second point is determined.

Here, each of the transformation matrices Mow, Mwo, Mwm, Mm, Mm', and Mmw is an affine matrix formed by a fourth-order square matrix because the affine matrix has a minor matrix indicating a linear transformation of the object in the virtual three-dimensional space and a position vector indicating a parallel translation of the object.

Thereafter, the transformation matrices Mow, Mwo stored in the Mow and Mwo transformation matrix storing sections 43, 44 are replaced with the transformation matrices Mow(new), Mwo(new).

Accordingly, even though an object is moved to a new point in the virtual three-dimensional space, the shape of the object positioned at the new point in the world coordinate system Cw can be drawn in the picture drawing section 49, and the shape of the object drawn can be displayed in the display 13.

2.2. Problems to be Solved by the Invention

However, the transformation matrix Mwo(new) is obtained by multiplying four types of fourth-order affine matrices each other in the affine matrix calculating section 47 according to the equation (3). To multiply a pair of fourth-order matrices each other, 64 (=4×4×4) times multiplications are generally required. Therefore, the number of multiplications required to move an object in the virtual three-dimensional space sums up to 192 (=3×4×4×4). Accordingly, in cases where the movement of many objects are processed in the conventional three-dimensional object movement processing apparatus 41, there is a drawback that responsibility in the operating system 11 having the conventional three-dimensional object movement processing apparatus 41 deteriorates.

Also, in cases where an inverse transformation matrix $Mow^{-1}(new)$ of the transformation matrix Mow(new) is calculated as the transformation matrix Mwo(new), a cofactor expansion is recursively performed to calculate a determinant |Mow(new)|. In detail, in cases where a cofactor of a component $a_{ij}$ in a matrix A is expressed by a symbol $\Delta ij$, an inverse matrix $A^{-1}$ of the matrix A is formulated by an equation (4).

$$A^{-1} = 1/|A| * \begin{pmatrix} |\Delta_{11}| & |\Delta_{21}| & \cdots & |\Delta_{n1}| \\ |\Delta_{12}| & |\Delta_{22}| & \cdots & |\Delta_{n2}| \\ - & - & \cdots & - \\ |\Delta_{1n}| & |\Delta_{2n}| & \cdots & |\Delta_{nn}| \end{pmatrix} \qquad (4)$$

In this case, the number N of multiplications required to obtain the inverse matrix $A^{-1}$ is formulated by an equation (5).

$$N(n) = \sum_{k=1}^{n} {}_nP_k + n*n*\Sigma_{n-1}P_k + n*n \quad (5)$$

Therefore, when the inverse transformation matrix Mow⁻¹(new) of the transformation matrix Mow(new) formed by the fourth-order affine matrix is calculated, the number N of multiplications required sums up to 200 according to an equation (6).

$$\begin{aligned} N(4) &= ({}_4P_1 + {}_4P_2 + {}_4P_3) + 4*4*({}_3P_1 + {}_3P_2) + 4*4 \\ &= 40 + 16*9 + 16 \\ &= 200 \end{aligned} \quad (6)$$

Therefore, in cases where many objects are moved, the responsibility in the operating system 11 having the conventional three-dimensional object movement processing apparatus 41 also deteriorates.

SUMMARY OF THE INVENTION

An object of the present invention is to provide, with due consideration to the drawback of such a conventional three-dimensional object movement processing apparatus, a three-dimensional object movement and transformation processing apparatus in which movement and transformation of an object are performed at high speed in a three-dimensional space with an inverse matrix calculating apparatus.

The object is achieved by the provision of a three-dimensional object movement and transformation processing apparatus, comprising:

shape storing means for storing shapes of a plurality of objects including a first object which are prescribed in shape prescription coordinate systems of a three-dimensional space;

Mwo matrix storing means for storing a plurality of transformation affine matrices Mwo which transform a world coordinate system of the three-dimensional space to the shape prescription coordinate systems prescribing the shapes of the objects stored in the shape storing means;

Mow matrix storing means for storing a plurality of transformation affine matrices Mow which transform the shape prescription coordinate systems prescribing the shapes of the objects stored in the shape storing means to the world coordinate system;

input means for inputting a piece of movement data designating an amount of movement or transformation of the first object and inputting a piece of inter-object processing data designating changes of shapes of the objects stored in the shape storing means while relating the changes of the shapes to each other;

movement matrix generating means for generating movement matrices indicating the movement or transformation of the first object according to the movement data input to the input means;

affine matrix calculating means for calculating a transformation affine matrix Mow(new) relating to the first object moved or transformed according to the movement data by utilizing the movement matrices generated in the movement matrix generating means and a transformation affine matrix Mow(old) which relates to the first object not moved nor transformed and is stored in the Mow matrix storing means, the transformation affine matrix Mow(new) being stored in the Mow matrix storing means to replace the transformation affine matrix Mow(old) with the transformation affine matrix Mow(new);

an inverse matrix calculating apparatus for calculating an inverse matrix Mow⁻¹(new) of the transformation affine matrix Mow(new) stored in the Mow matrix storing means, the inverse matrix calculating apparatus comprising affine matrix dividing means for dividing the transformation affine matrix Mow(new) into a minor matrix Q indicating a linear transformation of the first object and a position vector p indicating a parallel translation of the first object, inverse matrix calculating means for calculating an inverse matrix $Q^{-1}$ of the minor matrix Q divided in the affine matrix dividing means, vector-matrix multiplying means for multiplying the position vector p divided in the affine matrix dividing means by the inverse matrix $Q^{-1}$ calculated in the inverse matrix calculating means to produce a vector $pQ^{-1}$ and changing a sign of the matrix $pQ^{-1}$ to produce a multiplied vector $-pQ^{-1}$, and inverse affine matrix arranging means for arranging the inverse matrix $Q^{-1}$ calculated in the inverse matrix calculating means as a minor matrix of the inverse matrix Mow⁻¹(new) and arranging the multiplied vector $-pQ^{-1}$ produced in the vector-matrix multiplying means as a position vector of the inverse matrix Mow⁻¹(new) to produce the inverse matrix Mow⁻¹(new) having the minor matrix $Q^{-1}$ and the position vector $-pQ^{-1}$, the inverse matrix Mow⁻¹(new) being stored in the Mwo matrix storing means as a transformation affine matrix Mwo(new) relating to the first object moved or transformed to replace a transformation affine matrix Mwo(old) which is stored in the Mwo matrix storing means and relates to the first object not moved nor transformed with the inverse matrix Mow⁻¹(new);

inter-object processing means for transforming the shape prescription coordinate systems prescribing the shapes of the objects stored in the shape storing means to the world coordinate system by utilizing the transformation affine matrices Mow including the transformation affine matrix Mow(new) stored in the Mow matrix storing means, changing the shapes of the objects prescribed in the world coordinate system to processed shapes of the objects while relating the changes of the shapes to each other according to the inter-object processing data input to the input means, transforming the world coordinate system prescribing the processed shapes of the objects to the shape prescription coordinate systems by utilizing the transformation affine matrices Mwo including the transformation affine matrix Mwo(new) stored in the Mwo matrix storing means, and replacing the shapes of the objects stored in the shape storing means with the processed shapes of the objects prescribed in the shape prescription coordinate systems; and displaying means for displaying the processed shapes of the objects stored in the shape storing means.

Generally, in cases where the transformation affine matrix Mow is indicated by an equation (A), the inverse matrix Mow⁻¹ of the transformation affine matrix Mow is mathematically indicated by an equation (B).

$$Mow = \begin{pmatrix} Q & 0 \\ p & 1 \end{pmatrix} \quad (A)$$

-continued $$Mow^{-1} = \begin{pmatrix} Q^{-1} & 0 \\ -pQ^{-1} & 1 \end{pmatrix} \quad (B)$$

Where the matrix Q is the minor matrix and the vector p is the position vector.

In the above configuration, an inverse matrix $Mow^{-1}$ of the transformation affine matrix Mow stored in the Mow matrix storing means is calculated in the inverse matrix calculating apparatus. In detail, the transformation affine matrix Mow is divided into the minor matrix Q and the position vector p in the affine matrix dividing means. Thereafter, the minor matrix $Q^{-1}$ of the inverse matrix $Mow^{-1}$ is calculated in the inverse matrix calculating means, and the position vector $-pQ^{-1}$ is calculated in the vector-matrix multiplying means. Thereafter, the minor matrix $Q^{-1}$ and the position vector $-pQ^{-1}$ are arranged to produce the inverse matrix $Mow^{-1}$ in the inverse affine matrix arranging means.

In cases where an first object is moved or transformed in a three-dimensional space, the minor matrix Q indicating a linear transformation of the first object is a three-order square matrix. Therefore, the number of multiplications required to calculate the minor matrix $Q^{-1}$ in the inverse matrix calculating means is no more than 36. Also, the position vector p is a three-order vector. Therefore, the number of multiplications required to calculate the position vector $-pQ^{-1}$ in the vector-matrix multiplying means is no more than 9. Also, the inverse matrix $Mow^{-1}$ agrees with the transformation affine matrix Mwo stored in the Mwo matrix storing means. Therefore, the inverse matrix $Mow^{-1}$ is calculated as a transformation affine matrix Mwo in the inverse matrix calculating apparatus. As a result, the number of multiplications required to calculate the transformation affine matrix Mwo is only 45.

Accordingly, the transformation affine matrix Mwo can be calculated in the inverse matrix calculating apparatus at high speed.

When an object is moved or transformed, a shape prescription coordinate system prescribing the shape of the object is moved or scaled up or down because the position of the first object prescribed in a shape prescription coordinate system is unchangeable. Therefore, in cases where a piece of movement data designating an amount of movement or transformation of the first object is input to the input means, a shape prescription coordinate system prescribing the shape of the first object is moved or scaled up or down, so that transformation affine matrices Mow(old), Mwo(old) relating to the first object not moved nor transformed are required to be changed to transformation affine matrices Mow(new), Mwo(new) relating to the first object moved or transformed according to the movement data. To change the matrices Mow(old), Mwo(old), movement matrices indicating the movement or transformation of the first object is generated in the movement matrix generating means according to the movement data. Thereafter, the transformation affine matrix Mow(old) stored in the Mow matrix storing means is changed to the transformation affine matrix Mow(new) in the affine matrix calculating means by utilizing the movement matrices generated in the movement matrix generating means. Thereafter, the transformation affine matrix Mwo(new) is calculated in the inverse matrix calculating apparatus by utilizing the transformation affine matrix Mow(new) stored in the Mow matrix storing means and is stored in the Mwo matrix storing means to replace the transformation affine matrix Mwo(old) with the transformation affine matrix Mwo(new).

Thereafter, when a piece of inter-object processing data is input to the input means to change shapes of the objects stored in the shape storing means while relating the changes of the shapes to each other, the shapes of the objects stored in the shape storing means are transferred to the inter-object processing means, and the shape prescription coordinate systems prescribing the shapes of the objects are transformed to the world coordinate system by utilizing the transformation affine matrices Mow stored in the Mow matrix storing means. Because the shapes of the objects are prescribed in the same world coordinate system, the changes of the shapes relating to each other can be performed to produce the processed shapes of the objects according to the inter-object processing data in the inter-object processing means. In this case, because the transformation affine matrix Mow(new) is stored in the Mow matrix storing means, the movement or transformation of the first object included in the objects is reflected on the change of the shape of the first object in the world coordinate system. After the shapes of the objects are changed, the world coordinate system prescribing the processed shapes of the objects is transformed to the shape prescription coordinate systems In the inter-object processing means by utilizing the transformation affine matrices Mwo stored in the Mwo matrix storing means. Thereafter, the processed shapes of the objects prescribed in the shape prescription coordinate systems are stored in the shape storing means. In this case, because the transformation affine matrix Mwo(new) is stored in the Mwo matrix storing means, the movement or transformation of the first object included in the objects is reflected on the processed shape of the first object prescribed in the shape prescribing coordinate system.

Thereafter, the processed shapes of the objects stored in the shape storing means are displayed in the displaying means according to an output instruction input to the input means.

Accordingly, because the inverse matrix $Mow^{-1}$(new) can be calculated in the inverse matrix calculating apparatus at high speed, a moving or transforming time required to move or transform the first object can be shortened. Therefore, an inter-object processing performed after the movement or transformation of the first object can be performed without waiting for a long time.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of an Inverse matrix calculating apparatus and a virtual three-dimensional object movement and transformation processing apparatus with the inverse matrix calculating apparatus according to the present invention are described with reference to drawings.

Inverse matrix calculating apparatuses respectively utilized in a three-dimensional object movement and transformation processing apparatus according to the present invention are initially described in first to fourth embodiments.

First Embodiment

General mathematical characteristics of an affine matrix M utilized to move and/or transform an object in a virtual three-dimensional space are initially described.

The affine matrix M consists of a minor matrix Q indicating a linear transformation of the object and a position vector p indicating a parallel translation of the object. The affine matrix M, the minor matrix Q, and the position vector p are generally formulated by an equation (7).

$$M = \begin{pmatrix} Q & 0 \\ p & 1 \end{pmatrix} \quad Q = \begin{pmatrix} a & b & c \\ d & e & f \\ g & h & i \end{pmatrix} \quad p = (j \ k \ l) \tag{7}$$

Therefore, the affine matrix M can be rewritten according to an equation (8).

$$M = \begin{pmatrix} a & b & c & 0 \\ d & e & f & 0 \\ g & h & i & 0 \\ j & k & l & 1 \end{pmatrix} \tag{8}$$

In this case, the inverse affine matrix $M^{-1}$ of the affine matrix M is formulated by an equation (9) because the multiplication of the inverse affine matrix $M^{-1}$ and the affine matrix M produces a unit matrix E.

$$M^{-1} = \begin{pmatrix} Q^{-1} & 0 \\ -pQ^{-1} & 1 \end{pmatrix} \tag{9}$$

Figure 1:
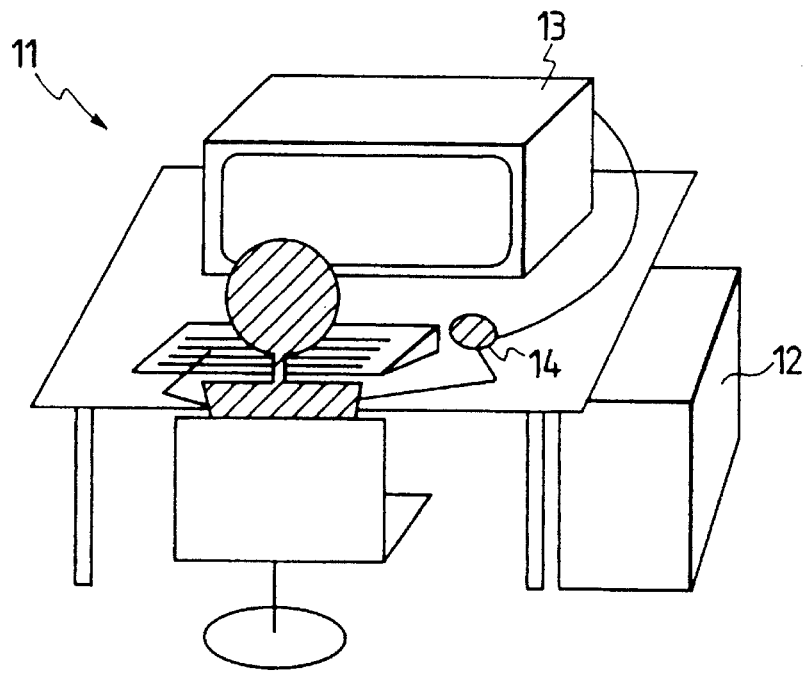
FIG. 1 schematically shows an operating system for operating a three-dimensional object movement processing apparatus conventionally utilized.
Figure 2:
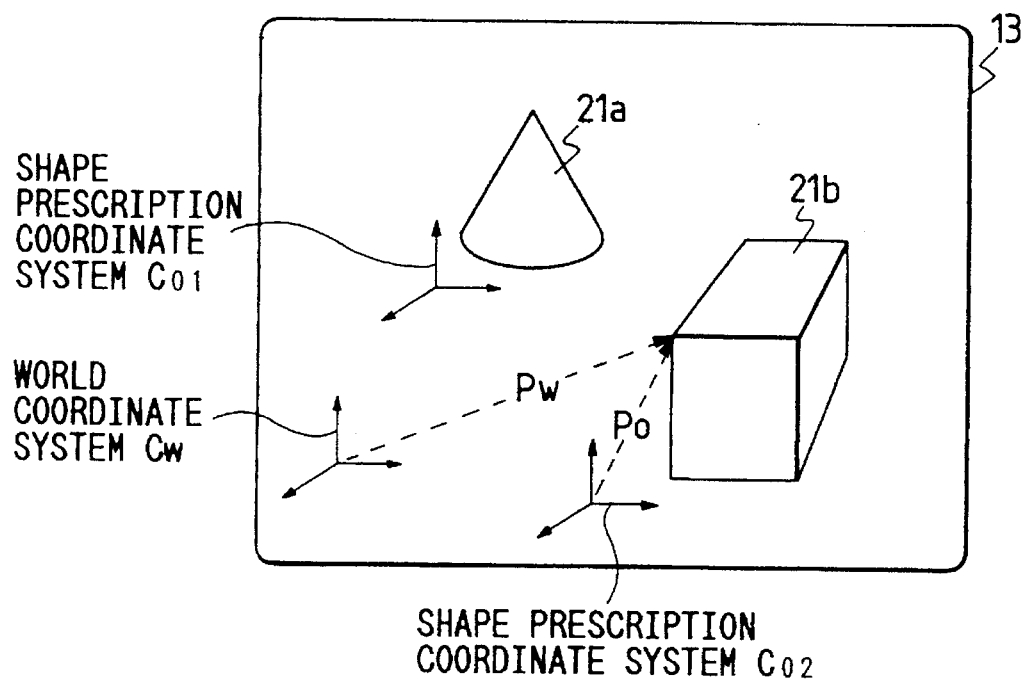
FIG. 2 shows a plurality of objects displayed in a display apparatus shown in FIG. 1 as an example, each of shapes of the objects being prescribed in the same world coordinate system and a particular shape prescription coordinate system.
Figure 3:
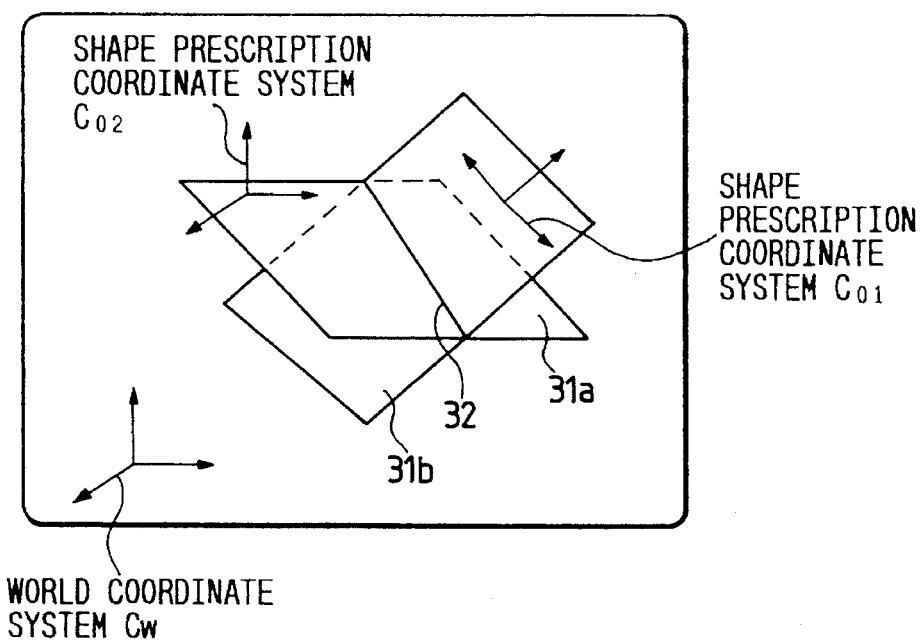
FIG. 3 shows a plurality of objects displayed in a display apparatus shown in FIG. 1 to explain an inter-object processing in which the objects are cut along a crossed line of the objects.
Figure 4:
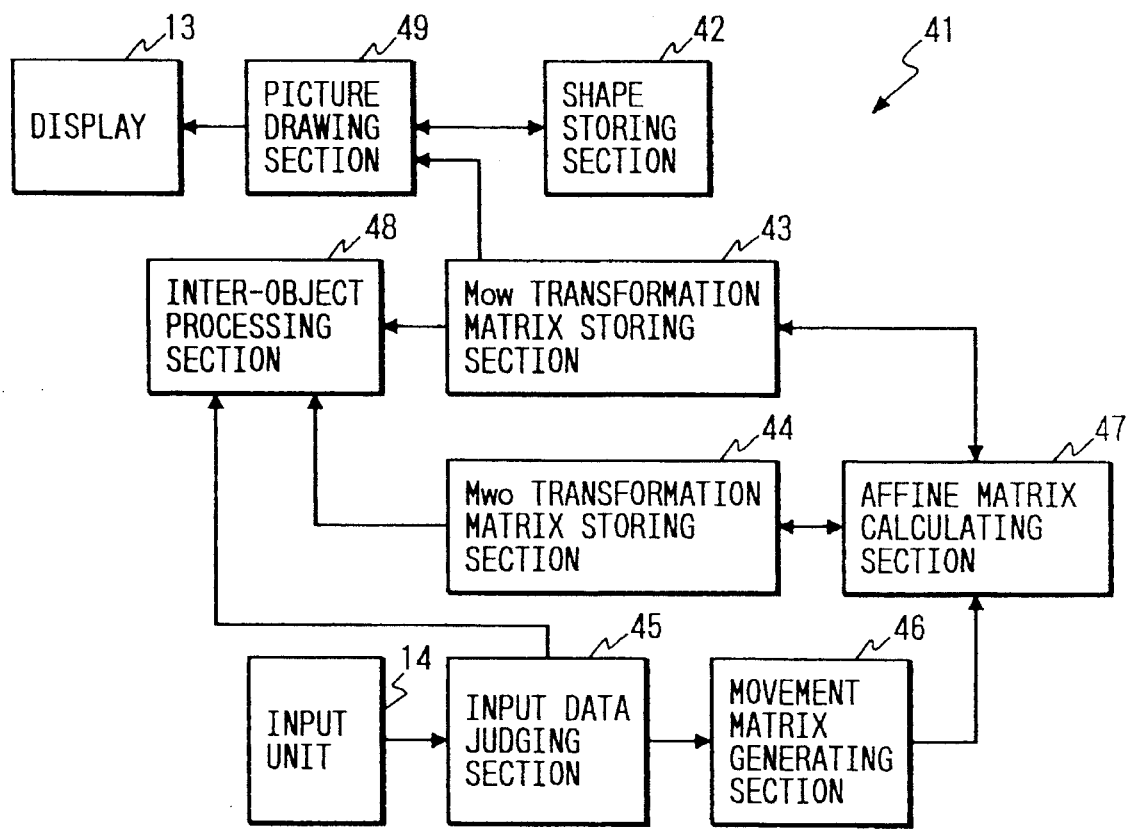
FIG. 4 is a constitutional block diagram of a conventional three-dimensional object movement processing apparatus.
Figure 5:
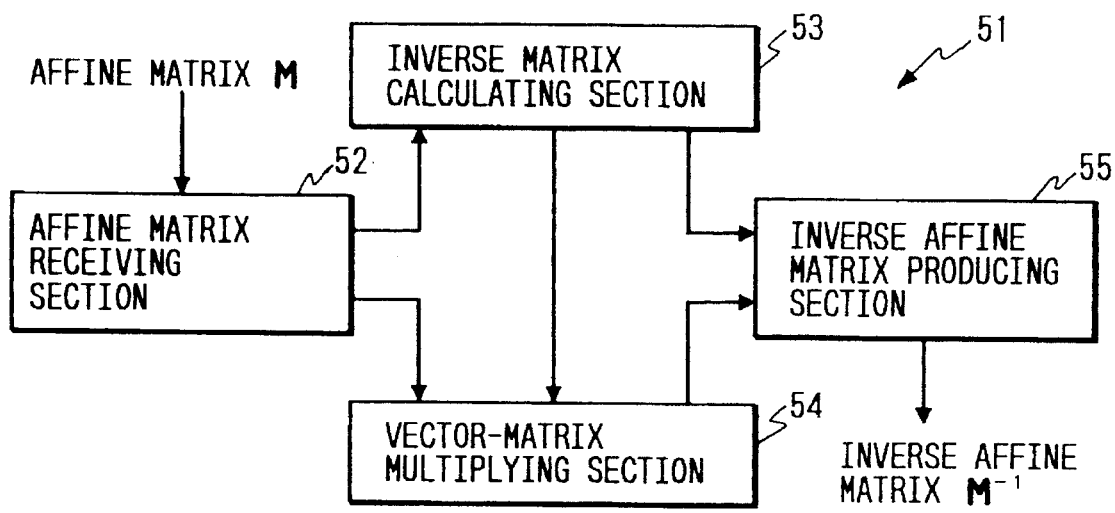
FIG. 5 is a block diagram of an inverse matrix calculating apparatus according to a first embodiment of the present invention.

FIG. 5 is a block diagram of an inverse matrix calculating apparatus according to a first embodiment of the present invention.

In the first embodiment, a physical relationship that an inverse transformation matrix $Mow^{-1}$(new) of the transformation matrix Mow(new) agrees with the transformation matrix Mwo(new) is utilized.

As shown in FIG. 5, an inverse matrix calculating apparatus 51 comprises an affine matrix receiving section 52 for receiving the affine matrix M formed by a fourth-order square matrix to divide the affine matrix M into the minor matrix Q indicating a linear transformation of an object and the position vector p of the affine matrix M indicating a parallel translation of the object, an inverse matrix calculating section 53 for calculating an inverse matrix of the minor matrix Q divided in the affine matrix receiving section 52, a vector-matrix multiplying section 54 for multiplying the position vector p divided in the affine matrix receiving section 52 by the inverse matrix $Q^{-1}$ calculated in the inverse matrix calculating section 53 to obtain a multiplied vector $pQ^{-1}$ and changing a sign of the multiplied vector $pQ^{-1}$ to produce another multiplied vector $-pQ^{-1}$, and an inverse affine matrix producing section 55 for producing an inverse affine matrix $M^{-1}$ of the affine matrix M according to the equation (9) by setting the inverse matrix $Q^{-1}$ calculated in the inverse matrix calculating section 53 as a minor matrix of the inverse affine matrix $M^{-1}$ indicating a linear transformation of the object, setting the multiplied vector $-pQ^{-1}$ obtained in the vector-matrix multiplying section 54 as a position vector of the inverse affine matrix $M^{-1}$ indicating a parallel translation of the object, and setting values 0 and 1 to remaining cells of the inverse affine matrix $M^{-1}$. The linear translation indicated by the minor matrix Q and the inverse affine matrix $M^{-1}$ denotes a general movement of the object including both a rotational motion and a general transformation of the object.

In the above configuration of the inverse matrix calculating apparatus 51, the minor matrix Q and the position vector p are taken out from the affine matrix M in the affine matrix receiving section 52. Thereafter, the inverse matrix $Q^{-1}$ of the minor matrix Q is calculated by recursively performing a cofactor expansion to calculate a determinant |Q| in the inverse matrix calculating section 53, and the multiplied vector $pQ^{-1}$ is calculated in the vector-matrix multiplying section 54. Thereafter, the inverse affine matrix $M^{-1}$ is obtained according to the equation (9) in the inverse affine matrix producing section 55.

Therefore, in cases where an object is moved and/or transformed in a virtual three-dimensional space, the transformation matrix Mow(new) transforming the shape prescription coordinate system Co to the world coordinate system Cw is initially calculated according to the equation (2) in the affine matrix multiplication section 46. Thereafter, the transformation matrix Mow(new) calculated is input to the inverse matrix calculating apparatus 51, and an inverse transformation matrix Mow$^{-1}$(new) of the transformation matrix Mow(new) is calculated as the transformation matrix Mwo(new) in the inverse matrix calculating apparatus 51. Therefore, the transformation matrix Mwo(new) can be obtained without utilizing the equation (3).

To obtain the inverse affine matrix M$^{-1}$, the multiplication in the inverse matrix calculating section 53 and the multiplication in the vector-matrix multiplying section 54 are required to obtain the inverse matrix Q$^{-1}$ formed by a third-order square matrix and the multiplied vector -pQ$^{-1}$. The number N of multiplications required to obtain the inverse matrix Q$^{-1}$ sums up to 36 as is formulated by an equation (10).

$$N = (_3P_1 + _3P_2) + 3*3*{_3P_1} + 3*3 \qquad (10)$$
$$= 9 + 9*2 + 9$$
$$= 36$$

Also, the number of multiplications required to obtain the multiplied vector -pQ$^{-1}$ sums up to 9. Therefore, the number of multiplications required to calculate the inverse affine matrix M$^{-1}$ sums up to only 45. That is, the inverse affine matrix M$^{-1}$ of the affine matrix M can be calculated at high speed in the inverse matrix calculating apparatus 51 according to the present invention, in comparison with a case that the number of multiplications required to calculate the inverse transformation matrix Mow$^{-1}$(new) of the transformation matrix Mow(new) formed by the fourth-order matrix conventionally sums up to 200.

Accordingly, even though the object is moved and/or transformed in the virtual three-dimensional space, the transformation matrix Mwo(new) can be obtained at high speed in the inverse matrix calculating apparatus 51.

Second Embodiment

Next, a second embodiment is described.

In mathematics, in cases where a linear transformation indicated by a minor matrix of an affine matrix denotes a rotational motion only, the minor matrix is classified as a normalized orthogonal matrix, and an inverse matrix of the normalized orthogonal matrix agrees with a transposed matrix. That is, the minor matrix is classified as a unitary matrix. In the second embodiment, the above mathematical relationship is utilized. Also, the physical relationship that the inverse transformation matrix Mow$^{-1}$(new) of the transformation matrix Mow(new) agrees with the transformation matrix Mwo(new) is utilized.

In detail, a transposed matrix Q$^t$ of the minor matrix Q agrees with the inverse matrix Q$^{-1}$ of the minor matrix Q. Therefore, the equation (9) can be rewritten to an equation (11).

$$M^{-1} = \begin{pmatrix} Q^t & 0 \\ -pQ^t & 1 \end{pmatrix} \qquad (11)$$

Figure 6:
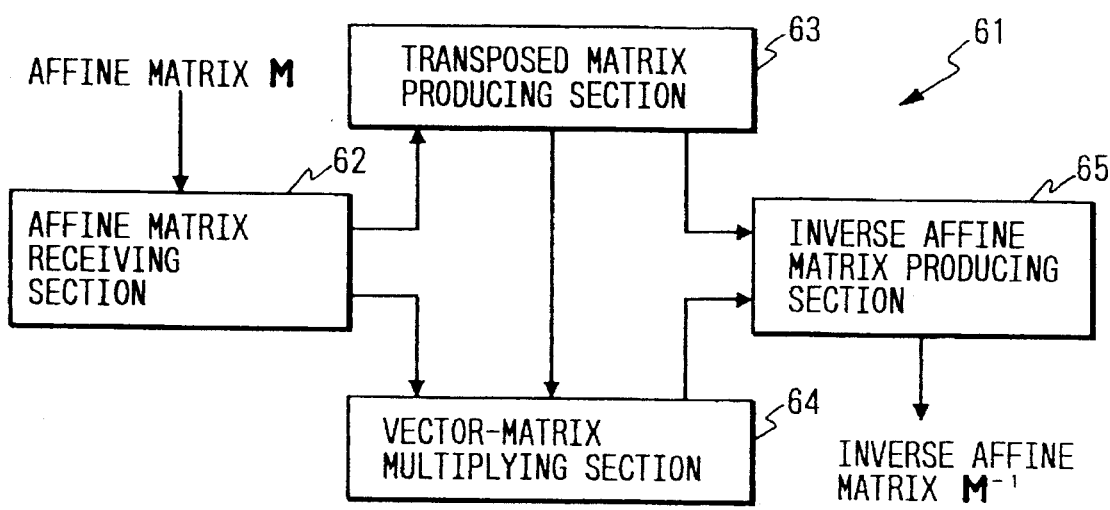
FIG. 6 is a block diagram of an inverse matrix calculating apparatus according to a second embodiment of the present invention.

FIG. 6 is a block diagram of an inverse matrix calculating apparatus according to a second embodiment of the present invention.

As shown in FIG. 6, an inverse matrix calculating apparatus 61 comprises an affine matrix receiving section 62 for receiving the affine matrix M formed by a fourth-order square matrix to divide the affine matrix M into the minor matrix Q indicating a rotational motion of an object and the position vector p of the affine matrix M indicating a parallel translation of the object, a transposed matrix producing section 63 for producing a transposed matrix Q$^t$ of the minor matrix Q divided in the affine matrix receiving section 62, a vector-matrix multiplying section 64 for multiplying the position vector p divided in the affine matrix receiving section 62 by the transposed matrix Q$^t$ calculated in the transposed matrix producing section 63 to obtain a multiplied vector pQ$^t$ and changing a sign of the multiplied vector pQ$^t$ to produce another multiplied vector -pQ$^t$, and an inverse affine matrix producing section 65 for producing an inverse affine matrix M$^{-1}$ of the affine matrix M by setting the transposed matrix Q$^t$ calculated in the transposed matrix producing section 63 as a minor matrix of the inverse affine matrix M$^{-1}$ indicating a rotational motion and a parallel translation of the object, setting the multiplied vector -pQ$^t$ obtained in the vector-matrix multiplying section 64 as a position vector of the inverse affine matrix M$^{-1}$ indicating a parallel translation of the object, and setting values 0 and 1 to remaining cells of the inverse affine matrix M$^{-1}$ according to the equation (11).

In the above configuration of the inverse matrix calculating apparatus 61, the minor matrix Q and the position vector p are taken out from the affine matrix M in the affine matrix receiving section 62. Thereafter, the transposed matrix Q$^t$ of the minor matrix Q is produced by exchanging rows and columns each other in the transposed matrix producing section 63, and the multiplied vector -pQ$^t$ is calculated in the vector-matrix multiplying section 64. Thereafter, the inverse affine matrix M$^{-1}$ is obtained according to the equation (11) in the inverse affine matrix producing section 65.

Therefore, in cases where an object is moved in parallel and/or is rotationally translated in a virtual three-dimensional space, the transformation matrix Mow(new) transforming the shape prescription coordinate system Co to the world coordinate system Cw is initially calculated according to the equation (2) in the affine matrix multiplication section 46. Thereafter, the transformation matrix Mow(new) calculated is input to the inverse matrix calculating apparatus 61, and an inverse transformation matrix Mow$^{-1}$(new) of the transformation matrix Mow(new) is calculated as the transformation matrix Mwo(new) in the inverse matrix calculating apparatus 61. Therefore, the transformation matrix Mwo(new) can be obtained without utilizing the equation (3).

To obtain the inverse affine matrix M$^{-1}$, the multiplication in the inverse matrix calculating section 53 is not required. Therefore, the multiplication in the vector-matrix multiplying section 64 is only required to obtain the multiplied vector -pQ$^{-1}$. The number of multiplications required in the vector-matrix multiplying section 64 sums up to 9. Therefore, the number of multiplications required to calculate the inverse affine matrix M$^{-1}$ sums up to only 45. That is, the inverse affine matrix M$^{-1}$ of the affine matrix M can be calculated at high speed in the inverse matrix calculating apparatus 61 according to the present invention, in comparison with a case that the number of multiplications required to calculate the inverse transformation matrix Mow$^{-1}$(new) of the transformation matrix Mow(new) formed by the fourth-order matrix conventionally sums up to 200.

Accordingly, even though the object is moved in parallel and/or is rotationally translated in the virtual three-dimensional space, the transformation matrix Mwo(new) can be obtained at high speed in the inverse matrix calculating apparatus 61.

Third Embodiment

In a third embodiment, an inverse matrix calculating apparatus utilized to make a rotational motion, a parallel translation, and an isotropic magnification or minification to an object in a virtual three-dimensional space. When the isotropic magnification or minification is given to the object in the virtual three-dimensional space, it is required to scale up or down a shape prescribing coordinate system Co prescribing the shape of the object to keep an unchangeable positional relationship between the object and the shape prescribing coordinate system Co.

General mathematical characteristics of an affine transformation matrix H utilized to perform a rotational motion, a parallel translation, and an isotropic magnification or minification of an object in a virtual three-dimensional space are initially described.

The affine transformation matrix H is generally formulated by an equation (12) in the same manner as the affine matrix M formulated by the equation (7).

$$H = \begin{pmatrix} Q & 0 \\ p & 1 \end{pmatrix} = \begin{pmatrix} Qx & 0 \\ Qy & 0 \\ Qz & 0 \\ p & 1 \end{pmatrix} \quad (12)$$

Where a minor matrix Q of the affine transformation matrix H indicates a linear transformation of the object and a position vector p of the affine transformation matrix H indicates a parallel translation of the object. Also, symbols Qx, Qy, Qz respectively denote an axial vector (or a row vector) of the minor matrix Q.

In the third embodiment, the object displayed in the display 13 is magnified or minified in the virtual three-dimensional space. Therefore, the affine transformation matrix H is also formulated by an equation (13).

$$H = SM \quad (13)$$

A matrix S indicates an isotropic magnification or minification of the object according to an equation (14).

$$S = \begin{pmatrix} sE & 0 \\ 0 & 1 \end{pmatrix} \quad (14)$$

Where the symbol s denotes a rate of the isotropic magnification or minification and a matrix E is a unit matrix.

A matrix M is an affine matrix indicating a rotational motion and a parallel translation of the object and is formulated by an equation (15).

$$M = \begin{pmatrix} R & 0 \\ p & 1 \end{pmatrix} \quad (15)$$

Where a matrix R is a unitary matrix indicating the rotational motion of the object and a position vector p indicates the parallel translation.

Therefore, the affine transformation matrix H can be formulated by an equation (16) by substituting the equations (14), (15) into the equation (13).

$$H = \begin{pmatrix} s*R & 0 \\ p & 1 \end{pmatrix} \quad (16)$$

The unitary matrix R is generally formulated by an equation (17).

$$R = \begin{pmatrix} Rx & 0 \\ Ry & 0 \\ Rz & 0 \end{pmatrix} \quad (17)$$

Where symbols Rx, Ry, Rz respectively denote an axial vector (or a row vector) of the unitary matrix R. Because the unitary matrix R satisfies a relationship $R(R^t)=E$, an equation (18) is satisfied.

$$Rx \cdot {}^t Rx = Ry \cdot {}^t Ry = Rz \cdot {}^t Rz = 1 \quad (18)$$

That is, an inner product of the axial vectors satisfies an equation (19).

$$(Rx,Rx)=(Ry,Ry)=(Rz,Rz)=1 \quad (19)$$

Because a relationship $Q=s*R$ is satisfied with reference to the equations (12), (16), the equation (19) can be rewritten to an equation (20).

$$(Qx,Qx)=(Qy,Qy)=(Qz,Qz)=s*s \quad (20)$$

An inverse matrix $H^{-1}$ of the affine transformation matrix H is formulated by an equation (21).

$$H^{-1} = M^{-1} S^{-1} \quad (21)$$

An inverse matrix $M^{-1}$ is formulated by an equation (22) in the same manner as the inverse affine matrix $M^{-1}$ formulated by the equation (11).

$$M^{-1} = \begin{pmatrix} R^t & 0 \\ -pR^t & 1 \end{pmatrix} \quad (22)$$

Also, an inverse matrix $S^{-1}$ of the matrix S is formulated by an equation (23) because the multiplication of the inverse matrix $S^{-1}$ and the matrix S produces the unit matrix E.

$$S^{-1} = \begin{pmatrix} 1/s*E^{-1} & 0 \\ 0 & 1 \end{pmatrix} \quad (23)$$

Therefore, the inverse matrix $H^{-1}$ can be formulated by an equation (24) by substituting the equations (22), (23) into the equation (21).

$$H^{-1} = \begin{pmatrix} {}^tR & 0 \\ -p^tR & 1 \end{pmatrix} \begin{pmatrix} 1/s*E^{-1} & 0 \\ 0 & 1 \end{pmatrix} \quad (24)$$

$$= \begin{pmatrix} 1/s*R^t & 0 \\ -1/s*pR^t & 1 \end{pmatrix}$$

Because the relationship $Q=s*R$ is satisfied, the equation (24) can be rewritten to an equation (25).

$$H^{-1} = \begin{pmatrix} Q^t/(s*s) & 0 \\ -pQ^t/(s*s) & 1 \end{pmatrix} \quad (25)$$

The term $(s*s)$ is determined by the relationship formulated by the equation (20).

Figure 7:
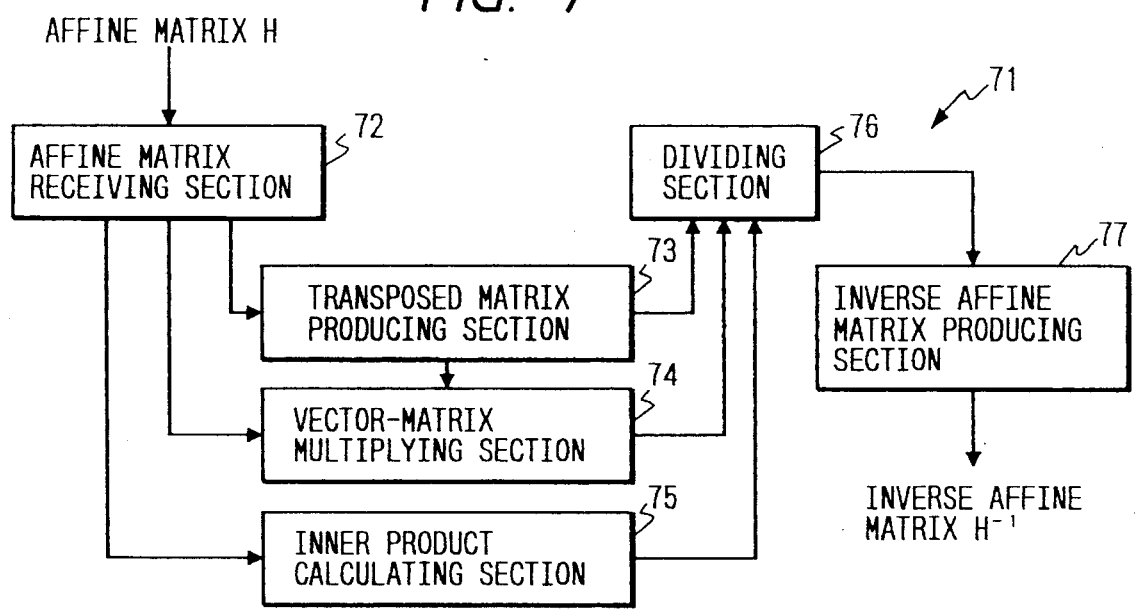
FIG. 7 is a block diagram of an inverse matrix calculating apparatus according to a third embodiment of the present invention.

FIG. 7 is a block diagram of an inverse matrix calculating apparatus according to a third embodiment of the present invention.

As shown in FIG. 7, an inverse matrix calculating apparatus 71 comprises an affine matrix receiving section 72 for receiving the affine matrix H formed by a fourth-order square matrix to take out the minor matrix Q indicating a rotational motion of an object and an isotropic magnification or minification of the object, the position vector p of the affine matrix H indicating a parallel translation of the object, and one of the axial vectors Qx, Qy, and Qz of the minor matrix Q, a transposed matrix producing section 73 for producing a transposed matrix $Q^t$ of the minor matrix Q taken out from the affine matrix H in the affine matrix receiving section 72, a vector-matrix multiplying section 74 for multiplying the position vector p taken out in the affine matrix receiving section 72 by the transposed matrix $Q^t$ calculated in the transposed matrix calculating section 73 to obtain a multiplied vector $pQ^t$ and changing a sign of the multiplied vector $pQ^t$ to produce another multiplied vector $-pQ^t$, an inner product calculating section 75 for calculating a squared product of an absolute value of the axial vector Qx, Qy, or Qz taken out from the affine matrix H in the affine matrix receiving section 72 to obtain a squared rate $s*s$ of the magnification or minification of the object according to the equation (20), a dividing section 76 for dividing each of components included in the transposed matrix $Q^t$ produced in the transposed matrix producing section 73 by the squared rate $s*s$ obtained in the inner product calculating section 75 and also dividing each of components included in the multiplied vector $-pQ^t$ obtained in the vector-matrix multiplying section 74 by the squared rate $s*s$, and an inverse affine matrix producing section 77 for producing an inverse affine matrix $H^{-1}$ of the affine matrix H by setting the transposed matrix $Q^t/(s*s)$ divided in the dividing section 76 as a minor matrix of the inverse affine matrix $H^{-1}$ indicating a rotational motion of the object and an isotropic magnification or minification of the object, setting the multiplied vector $-pQ^t$ obtained in the dividing section 76 as a position vector of the inverse affine matrix $H^{-1}$ indicating a parallel translation of the object, and setting values 0 and 1 to remaining cells of the inverse affine matrix $H^{-1}$ according to the equation (25).

In the above configuration of the inverse matrix calculating apparatus 71, the minor matrix Q, the position vector p, and one of the axial vectors Qx, Qy, and Qz are taken out from the affine matrix H in the affine matrix receiving section 72. Thereafter, the transposed matrix $Q^t$ of the minor matrix Q is produced by exchanging rows and columns each other in the transposed matrix producing section 73, the multiplied vector $-pQ^t$ is calculated in the vector-matrix multiplying section 74, and the squared rate $s*s$ of the magnification or minification is calculated in the inner product calculating section 75. Thereafter, a matrix $Q^t/(s*s)$ and a vector $-pQ^t/(s*s)$ are obtained in the dividing section 76. Thereafter, the inverse affine matrix $H^{-1}$ is obtained according to the equation (25) in the inverse affine matrix producing section 77.

Therefore, in cases where the rotational motion, the parallel translation, and the isotropic magnification or minification is given to an object in a virtual three-dimensional space, the transformation matrix Mow(new) transforming the shape prescription coordinate system Co to the world coordinate system Cw is initially calculated according to the equation (2) in the affine matrix multiplication section 46. Thereafter, the transformation matrix Mow(new) calculated is input to the inverse matrix calculating apparatus 71, and an inverse transformation matrix $Mow^{-1}$(new) of the transformation matrix Mow(new) is calculated as the transformation matrix Mwo(new) in the inverse matrix calculating apparatus 71. Therefore, the transformation matrix Mwo(new) can be obtained without utilizing the equation (3).

The multiplication in the vector-matrix multiplying section 74, the multiplication in the inner product calculating section 75, and the division in the dividing section 76 are required to obtain the inverse affine matrix $H^{-1}$. The number of multiplications required in the vector-matrix multiplying section 74 sums up to 9, the number of multiplications required in the inner product calculating section 75 sums up to 3, and the number of divisions required in the dividing section 76 sums up to 12. Therefore, the number of multiplications and divisions required to calculate the inverse affine matrix $H^{-1}$ sums up to only 24. That is, the inverse affine matrix $H^{-1}$ of the affine matrix H can be calculated at high speed in the inverse matrix calculating apparatus 71 according to the present invention, in comparison with a case that the number of multiplications required to calculate the inverse transformation matrix $Mow^{-1}$(new) of the transformation matrix Mow(new) formed by the fourth-order matrix conventionally sums up to 200.

Fourth Embodiment

Figure 8:
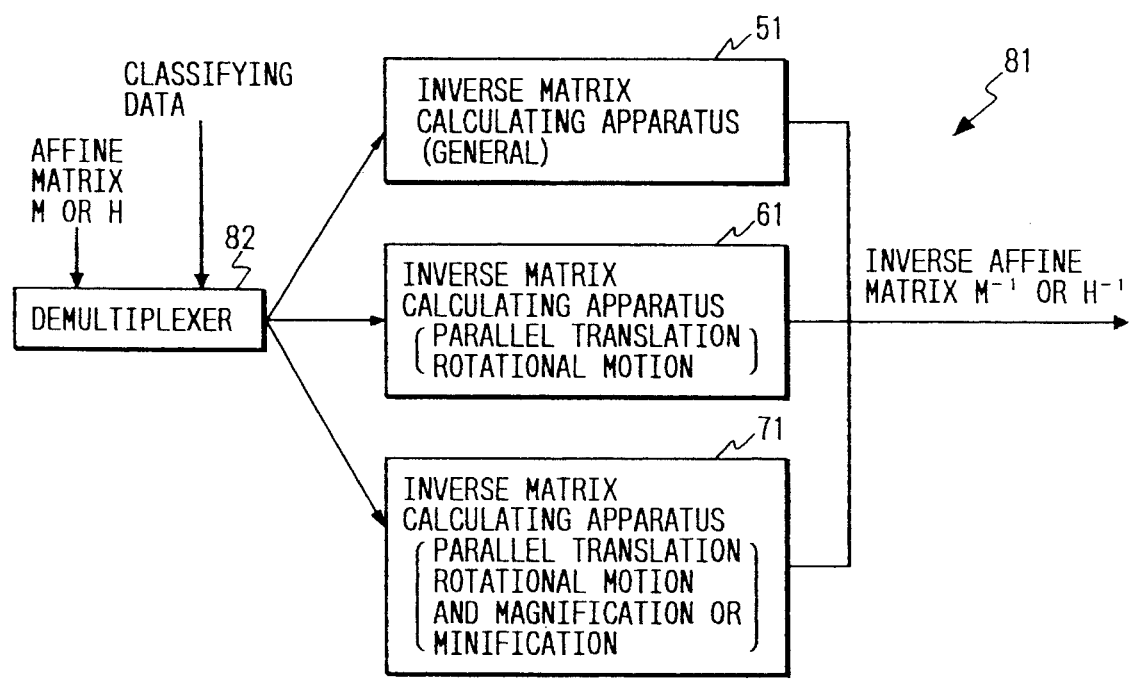
FIG. 8 is a block diagram of an inverse matrix calculating apparatus according to a fourth embodiment of the present invention.

FIG. 8 is a block diagram of an inverse matrix calculating apparatus according to a fourth embodiment of the present invention.

As shown in FIG. 8, an inverse matrix calculating apparatus 81 comprises a demultiplexer 82 for receiving the affine matrix M or H formulated by the equation (7) or (16) and a piece of classifying data with which a type of movement of an object is specified, the inverse matrix calculating apparatus 51, the inverse matrix calculating apparatus 61, and the inverse matrix calculating apparatus 71.

In the above configuration, the classifying data which classifies a type of movement of the object specified by the affine matrix M or H received in the demultiplexer 82 is automatically determined when a user inputs pieces of movement data such as a piece of general linear transformation data, a piece of rotational motion data, a piece of parallel translation data, and a piece of isotropic magnification or minification data. Also, it is applicable that the classifying data is determined by checking the components of the minor matrix Q or R and the positional vector p. For example, in cases where the minor matrix Q or R is classified as the unitary matrix, a rotational motion is included in the movement of the object. In cases where the value $s*s$ obtained by the calculation according to the equation (20) is not equal to 1, the isotropic magnification or mollification is included in the movement of the object. In cases where the positional vector p is not zero, a parallel translation is included in the movement of the object.

In cases where the classifying data received in the demultiplexer 82 indicates that the linear translation specified by the minor matrix Q denotes a general movement of the object including the rotational motion, the affine matrix M received in the demultiplexer 82 is transferred to the inverse matrix calculating apparatus 51. Thereafter, the inverse affine matrix $M^{-1}$ is calculated to move the object according to the general movement indicated by the affine matrix M.

In cases where the classifying data indicates that the linear translation specified by the minor matrix Q denotes a rotational motion of the object, the affine matrix M received in the demultiplexer 82 is transferred to the inverse matrix calculating apparatus 61. Thereafter, the inverse affine matrix $M^{-1}$ is calculated to move the object according to the rotational motion and a parallel translation indicated by the affine matrix M.

In cases where the classifying data indicates that the linear translation specified by the minor matrix Q denotes a rotational motion of the object and an isotropic magnification or minification of the object, the affine matrix H received in the demultiplexer 82 is transferred to the inverse matrix calculating apparatus 71. Thereafter, the inverse affine matrix $H^{-1}$ is calculated to move the object according to the rotational motion, the isotropic magnification or minification, and a parallel translation indicated by the affine matrix H.

Accordingly, an optimum calculating apparatus can be selected from among the inverse matrix calculating apparatuses 51, 61, 71 according to the movement of the object specified by the classifying data. Therefore, even though any type of movement indicated by the affine matrix M or H input to the demultiplexer 82 is required of the object, the object can be reliably moved at high speed in the virtual three-dimensional space by calculating the inverse affine matrix $M^{-1}$ or $H^{-1}$ in the optimum calculating apparatus.

It is preferred that the demultiplexer 82 have a data storing section for storing a combination of the classifying data and the the affine matrix M or H. In this case, the object can be arbitrarily moved in the virtual three-dimensional space by selecting one of the combinations.

Next, three-dimensional object movement and transformation processing apparatuses with the inverse matrix calculating apparatus 51, 61, 71, or 81 are described in fifth to ninth embodiments.

Fifth Embodiment

Figure 9:
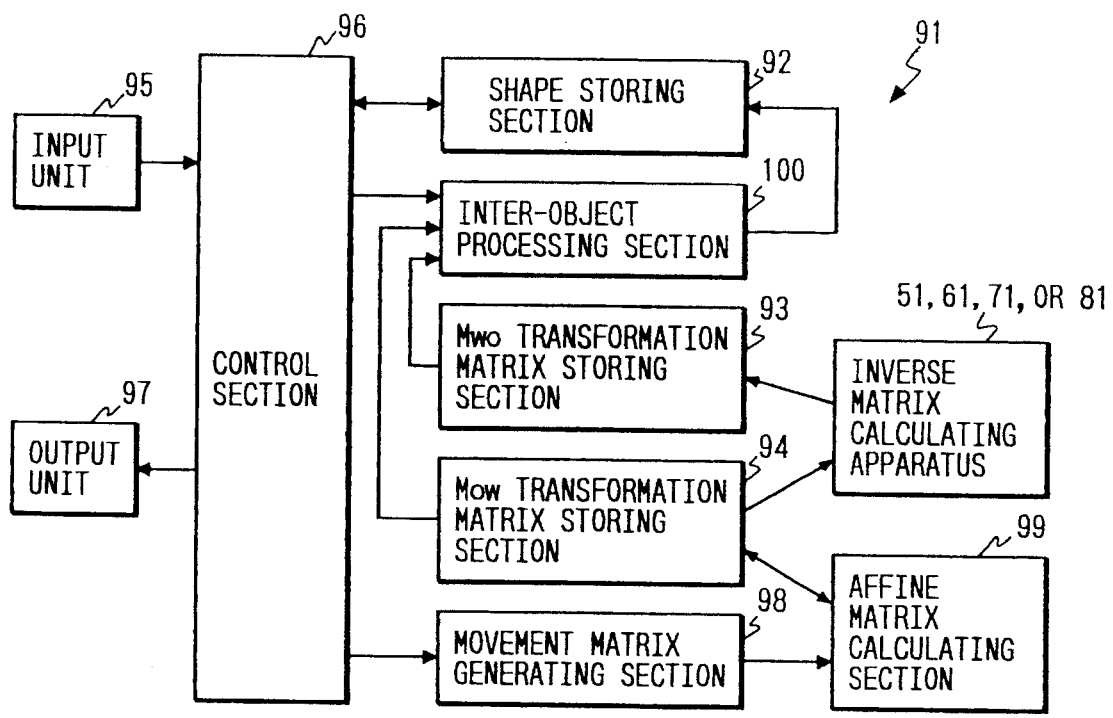
FIG. 9 is a block diagram of a three-dimensional object movement and transformation processing apparatus according to a fifth embodiment of the present invention.

FIG. 9 is a block diagram of a three-dimensional object movement and transformation processing apparatus according to a fifth embodiment of the present invention.

As shown in FIG. 9, a three-dimensional object movement and transformation processing apparatus 91 comprises a shape storing section 92 for storing pieces of shape data of a plurality of objects respectively prescribed in a shape prescription coordinate system Co ($Co_1$, $Co_2$, ... ) in a three-dimensional space, a Mwo transformation matrix storing section 93 for storing a plurality of transformation matrices Mwo which transform the world coordinate system Cw to the shape prescription coordinate systems Co to prescribe the shape data of the objects in the systems Co, and a Mow transformation matrix storing section 94 for storing a plurality of transformation matrices Mow which transform the shape prescription coordinate systems Co prescribing the shape data of the objects to the world coordinate system Cw to prescribe the shape data of the objects in the systems Cw.

The apparatus 91 further comprises an input unit 95 for inputting pieces of numeral data designating an amount of movement and transformation of an object Ob1 such as a parallel translation, a rotational motion, and an isotropic magnification or minification and inputting a piece of inter-object processing data designating changes of shapes of a plurality of objects Ob2 while relating the changes of the shapes to each other, a control section 96 for judging whether the input data given to the input unit 95 is the numeral data or the inter-object processing data, generating pieces of movement and transformation data according to the numeral data obtained in the input unit 95 in cases where the input data is the numeral data, and drawing shapes of the objects Ob2 prescribed in the world coordinate system Cw in common by utilizing the shape data of the objects Ob2 stored in the shape storing section 92 and the transformation matrices Mow stored in the Mow transformation matrix storing section 94, and an output unit 97 for outputting the shape of the objects Ob3 drawn in the control section 96.

The apparatus 91 further comprises a movement matrix generating section 98 for generating parallel movement affine matrices Mwm, Mmw relating to the parallel translation of the object Ob1 and a rotational movement affine matrix Mm relating to the rotational motion and the isotropic magnification or minification of the object Ob1 according to the movement and transformation data provided from the control section 96, an affine matrix calculating section 99 for calculating the amplification of the affine matrices Mwm, Mmw, and Mm generated in the movement matrix generating section 98 and a transformation matrix $Mo_1w$ which relates to the object Ob1 and is stored in the Mow transformation matrix storing section 94 to obtain a transformation matrix $Mo_1w(new)$ (=$Mo_1wMwmMmMmw$) and replacing the transformation matrix $Mo_1w$ with the transformation matrix $Mo_1w(new)$=$Mo_1wMwmMmMmw$, the inverse matrix calculating apparatus 51, 61, 71, or 81 for calculating an inverse matrix $Mo_1w^{-1}(new)$ of the transformation matrix $Mo_1w(new)$ as a new transformation matrix $Mwo_1(new)$ and replacing a transformation matrix $Mwo_1$, which relates to the object Ob1 and is stored in the Mwo transformation matrix storing section 93, with the transformation matrix $Mwo_1(new)$, and an inter-object processing section 100 for processing the objects Ob2 to change shapes of the objects Ob2 while the changes of the shapes relate to each other by utilizing the shape data of the objects Ob2 stored in the shape storing section 92 and the transformation matrices $Mwo_1$, $Mo_1w$ stored in the Mwo and Mow transformation matrix storing sections 93, 94 in cases where it is judged in the control section 96 that the inter-object processing data is input to the input unit 95 and replacing the shape data of the objects Ob2 stored in the shape storing section 92 with pieces of shape data of the objects Ob2 processed.

Figure 10:
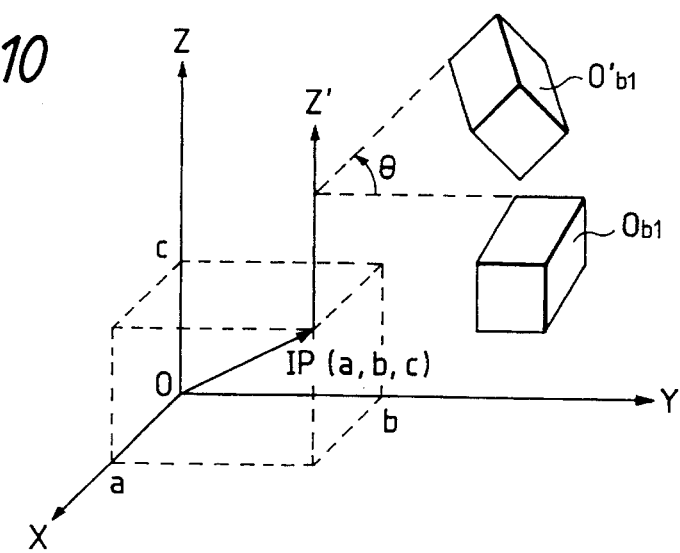
FIG. 10 shows an object rotated about a z'-axis of a translated coordinate system obtained by making a parallel translation defined by a position vector p=(a, b, c) to a world coordinate system Cw.

In the above configuration, when the numeral data are input to the input unit 95 to move the object Ob1, the parallel movement affine matrices Mwm, Mmw relating to the parallel translation of the object Ob1 and the rotational movement affine matrix Mm relating to the rotational motion and the isotropic magnification or minification of the object Ob1 are generated in the movement matrix generating section 98 under control of the control section 96. For example, as shown in FIG. 10, in cases where the object Ob1 is rotated by a rotational degree θ about a z'-axis of a translated coordinate system obtained by making a parallel translation defined by a position vector p=(a, b, c) to the world coordinate system Cw, the movement affine matrices Mwm, Mmw, Mm are formulated by an equation (26).

$$Mwm = \begin{pmatrix} 1 & 0 & 0 & 0 \\ 0 & 1 & 0 & 0 \\ 0 & 0 & 1 & 0 \\ -a & -b & -c & 1 \end{pmatrix}$$

$$Mm = \begin{pmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{pmatrix}$$

$$Mmw = \begin{pmatrix} 1 & 0 & 0 & 0 \\ 0 & 1 & 0 & 0 \\ 0 & 0 & 1 & 0 \\ a & b & c & 1 \end{pmatrix}$$

(26)

Thereafter, the multiplication of the movement affine matrices Mwm, Mmw, Mm and the transformation matrix $Mo_1w$ relating to the object Ob1 is performed In the affine matrix calculation section 99 to produce the transformation matrix $Mo_1w(new)=Mo_1wMwmMmMmw$. The transformation matrix $Mo_1w(new)$ relates to the object Ob1 moved according To the numeral data. Thereafter, the transformation matrix $Mo_1w$ stored in the Mow storing section 94 is replaced with the transformation matrix $Mo_1w(new)$. Thereafter, the inverse matrix $Mo_1w^{-1}(new)$ of the transformation matrix Mow(new) is calculated as the transformation matrix $Mwo_1(new)$ in the inverse matrix calculating apparatus 51, 61, 71, or 81. Thereafter, the transformation matrix $Mwo_1$ relating to the object Ob1 is replaced with the inverse matrix $Mo_1w^{-1}(new)$.

Accordingly, even though the object Ob1 is moved in a three-dimensional space and the shape prescribing coordinate system Co prescribing the shape of the object Ob1 is moved with the object Ob1, the transformation matrices $Mo_1w$, $Mo_1w$ can be reliably replaced with the transformation matrices $Mo_1w(new)$, $Mwo_1(new)$ at high speed because the inverse matrix $Mo_1w^{-1}(new)$ of the transformation matrix $Mo_1w(new)$ is calculated as the transformation matrix $Mwo_1(new)$ in the inverse matrix calculating apparatus 51, 61, 71, or 81.

Thereafter, when the inter-object processing data is input to the input unit 95, a plurality of objects Ob2 including the object Ob1 are simultaneously processed in the inter-object processing section 100 under control of the control section 96. In detail, shapes of the objects Ob2 prescribed in shape prescribing coordinate systems Co ($Co_1$, $Co_2$, ...) are read out from the shape storing section 92, and the transformation matrices Mow relating to the objects Ob2 are read out from the Mow transformation matrix storing section 94. Thereafter, the shapes of the objects Ob2 prescribed in the world coordinate system Cw are obtained in the inter-object processing section 100 under control of the control section 96, and the shapes of the objects Ob2 are changed in the world coordinate system Cw while the changes of the shapes relate to each other. For example, the shapes of the objects Ob2 are simultaneously changed by adding a crossed line of the objects Ob2 to the objects Ob2. Therefore, the changed shapes of the objects Ob2 are prescribed in the world coordinate system Cw. Thereafter, the transformation matrices Mwo relating to the objects Ob2 are read out from the Mwo transformation matrix storing section 93, and the changed shapes of the objects Ob2 are prescribed in the shape prescribing coordinate systems Co. Thereafter, the changed shapes of the objects Ob2 are stored in the shape storing section 92.

Accordingly, because the transformation matrices Mwo, Mow stored in the Mwo and Mow transformation matrix storing sections 93, 94 are rewritten at high speed by means of the inverse matrix calculating apparatus 51, 61, 71, or 81 and the affine matrix calculating section 99 when one of the objects Ob2 is moved, the shapes of the objects Ob2 can be immediately changed while the objects Ob2 relate to each other, and the shape data of the objects Ob2 stored in the shape storing section 92 can be immediately rewritten.

Thereafter, when an instruction ordering to output the shapes of the objects Ob2 is input to the input unit 95, the shapes of the objects Ob2 are output to the output unit 97 under control of the control section 96. For example, the shapes of the objects Ob2 are displayed in a display.

Accordingly, the shapes of the objects Ob2 can be immediately output because the shape data of the objects Ob2 stored in the shape storing section 92 are immediately rewritten.

Sixth Embodiment

Figure 11:
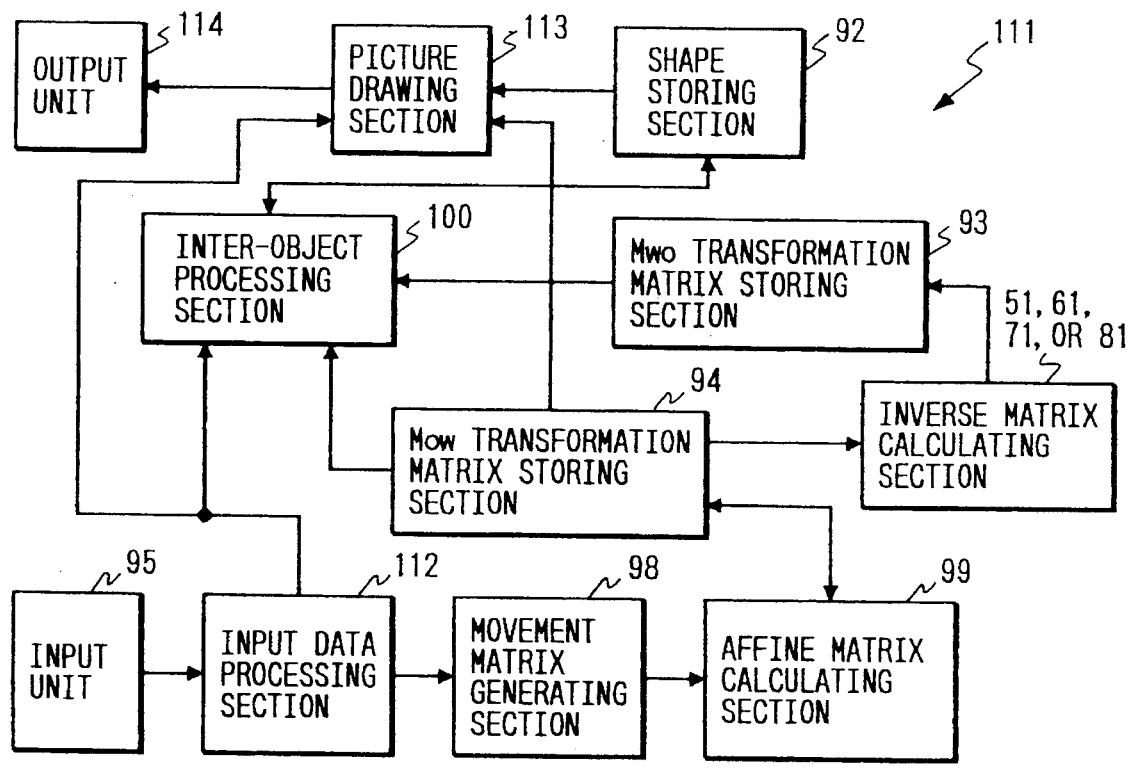
FIG. 11 is a block diagram of a three-dimensional object movement and transformation processing apparatus according to a sixth embodiment of the present invention.

FIG. 11 is a block diagram of a three-dimensional object movement and transformation processing apparatus according to a sixth embodiment of the present invention.

As shown in FIG. 11, a three-dimensional object movement and transformation processing apparatus 111 comprises the shape storing section 92, the Mwo transformation matrix storing section 93, the Mow transformation matrix storing section 94, the input unit 95, an input data processing section 112 for judging whether the input data given to the input unit 95 is the numeral data or the inter-object processing data, the movement matrix generating section 98 for generating the movement affine matrices Mwm, Mmw, Mm relating to the object Ob1 according to the movement and transformation data provided from the input data processing section 112 in cases where it is judged in the input processing section 112 that the numeral data is input to the input section 95, the affine matrix calculating section 99, the inverse matrix calculating apparatus 51, 61, 71, or 81, the inter-object processing section 100 for processing the objects Ob2 to change shapes of the objects Ob2 while the changes of the shapes relate to each other by utilizing the shape data of the objects Ob2 stored in the shape storing section 92 and the transformation matrices Mwo, Mow stored in the Mwo and Mow transformation matrix storing sections 93, 94 in cases where it is judged in the input processing section 112 that the inter-object processing data is input to the input unit 95 and replacing the shape data of the objects Ob2 stored in the shape storing section 92 with pieces of shape data of the objects Ob2 processed, a picture drawing section 113 for drawing pictures of the objects Ob2 prescribed in the world coordinate system according to the shape data of the objects Ob2 stored in the shape storing section 92 and the transformation matrices Mow stored in the Mow transformation matrix storing section 94, and an output unit 114 for outputting the pictures of the objects Ob2 drawn in the picture drawing section 113. The output unit 114 is, for example, a display of a graphical work station.

In the above configuration, when the numeral data are input to the input unit 95 to move the object Ob1, the input of the numeral data to the input unit 95 is detected in the input processing section 112. Therefore, the numeral data is transferred to the movement matrix generating section 98. In the section 98, the movement affine matrices Mwm, Mmw, Mm are generated according to the numeral data. Thereafter, the affine matrix calculation section 99 and the inverse matrix calculating apparatus 51, 61, 71, or 81 are operated to rewrite the transformation matrices $Mo_1w$, $Mwo_1$ stored in the Mow and Mwo storing sections 93, 94, in the same manner as in the fifth embodiment.

Accordingly, even though the object Ob1 is moved in the virtual three-dimensional space while moving the shape prescribing coordinate system Co prescribing the shape of the object Ob1 with the object Ob1, the transformation matrix $Mwo_1$ can be reliably rewritten at high speed because the inverse matrix $Mo_1w^{-1}$ of the transformation matrix $Mo_1w$ rewritten is calculated as the transformation matrix $Mwo_1$ written in the inverse matrix calculating apparatus 51, 61, 71, or 81.

Thereafter, when the inter-object processing data is input to the input unit 95, the input of the inter-object processing data to the input unit 95 is detected by the input processing section 112. Therefore, the inter-object processing section 100 is operated to process the objects Ob2, in the same manner as in the fifth embodiment. Thereafter, the shapes of the objects Ob2 processed are stored in the shape storing section 92.

Thereafter, when an instruction ordering to output the pictures of the objects Ob2 is input to the input unit 95, the pictures of the objects Ob2 are produced in the picture drawing section 113 and are output to the output unit 114. In the output unit 114, the pictures of the objects Ob2 are displayed in the display of the graphical work station.

Accordingly, because the transformation matrices Mwo, Mow stored in the Mwo and Mow transformation matrix storing sections 93, 94 are rewritten at high speed by means of the inverse matrix calculating apparatus 51, 61, 71, or 81 and the affine matrix calculating section 99 even though one of the objects is moved, the shapes of the objects can be immediately changed while the objects relate to each other, and the shape data of the objects stored in the shape storing section 92 can be immediately rewritten. Therefore, the shapes of the objects can be immediately displayed.

Seventh Embodiment

In a seventh embodiment, a first object A and a second object B are moved together while maintaining a positional relationship between the first and second objects A, B.

A transformation affine matrix Mab which transforms a shape prescription coordinate system Ca prescribing the first object A to a shape prescription coordinate system Cb prescribing the second object B is defined according to an equation (27).

$$Mab = MawMwb \quad (27)$$

Where a matrix Maw denotes a transformation affine matrix transforming the shape prescription coordinate system Ca to the world coordinate system Cw and a matrix Mwb denotes a transformation affine matrix transforming the world coordinate system Cw to the shape prescription coordinate system Cb. The transformation affine matrix Mab is unchangeable even though the first and second objects A, B are moved because the positional relationship between the first and second objects A, B is maintained.

Also, the transformation affine matrix Maw is obtained according to an equation (28).

$$Maw = MabMbw \quad (28)$$

Where a matrix Mbw denotes a transformation affine matrix transforming the shape prescription coordinate system Cb to the world coordinate system Cw.

A transformation affine matrix Mwa transforming the world coordinate system Cw to the shape prescription coordinate system Ca is obtained according to an equation (29).

$$Mwa = Maw^{-1} \quad (29)$$

Also, a transformation affine matrix Mwb transforming the world coordinate system Cw to the shape prescription coordinate system Cb is obtained according to an equation (30).

$$Mwb = Mbw^{-1} \quad (30)$$

Figure 12:
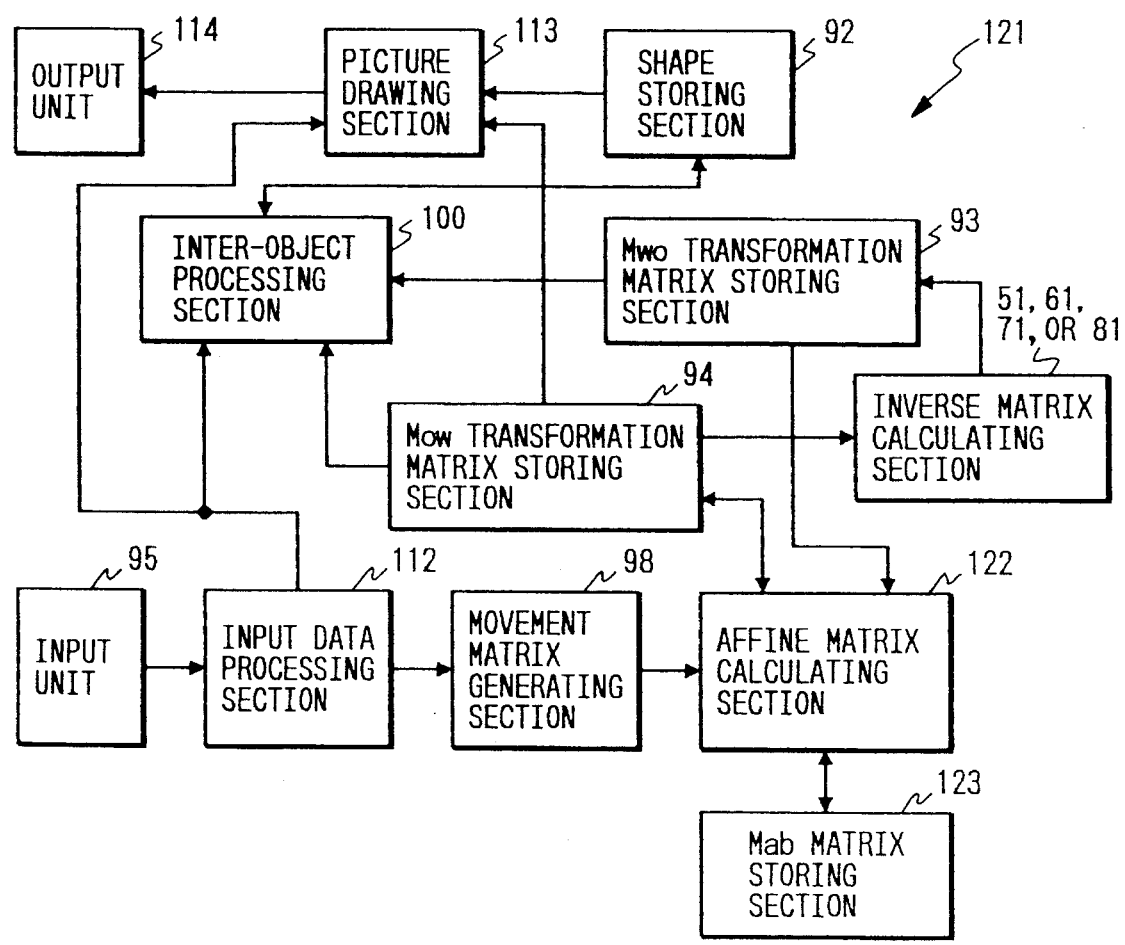
FIG. 12 is a block diagram of a three-dimensional object movement and transformation processing apparatus according to a seventh embodiment of the present invention.

FIG. 12 is a block diagram of a three-dimensional object movement and transformation processing apparatus according to a seventh embodiment of the present invention.

As shown in FIG. 12, a three-dimensional object movement and transformation processing apparatus 121 comprises the shape storing section 92, the Mwo transformation matrix storing section 93, the Mow transformation matrix storing section 94, the input unit 95 for inputting pieces of numeral data designating an amount of movement or transformation of the first and second objects A, B and inputting a piece of inter-object processing data which designates changes of shapes of a plurality of objects Ob2 including the first and second objects A and B while relating the changes of the shapes to each other, the input processing section 112, the movement matrix generating section 98 for generating parallel movement affine matrices Mwm, Mmw relating to the parallel translation of the second object B and a rotational movement affine matrix Mm relating to the rotational motion and the isotropic magnification or minification of the second object B according to the movement and transformation data, an affine matrix calculating section 122 for calculating a transformation matrix Mbw(new)=MbwMwmMmMmw by amplifying the affine matrices Mwm, Mmw, and Mm and the transformation matrix Mbw stored in the Mow transformation matrix storing section 94 to store the transformation matrix Mbw(new) in the section 94 in place of the transformation matrix Mbw, calculating the transformation affine matrix Mab according to the equation (27) by utilizing the matrices Maw, Mwb stored in the storing sections 93, 94, and calculating the transformation matrix Maw according to the equation (28) by utilizing the transformation affine matrix Mab and the transformation matrix Mbw stored in the Mow transformation matrix storing section 94, a Mab matrix storing section 123 for temporarily storing the transformation affine matrix Mab, the inverse matrix calculating apparatus 51, 61, 71, or 81 for calculating inverse matrices $Maw^{-1}(new)$, $Mbw^{-1}(new)$ of the transformation matrices Maw(new), Mbw(new) stored in the Mow transformation matrix storing section 94 as transformation affine matrices Mwa(new), Mwb(new), the inter-object processing section 100, the picture drawing section 113, and the output unit 114.

In the above configuration, when the numeral data are input to the input unit 95 to move the first and second objects A. B together while maintaining a positional relationship between the first and second objects A, B, the input of the numeral data to the input unit 95 is detected in the input processing section 112. Therefore, the numeral data indicating the amount of movement of the second object B is transferred to the movement matrix generating section 98. In the section 98, the movement affine matrices Mwm, Mmw, Mm are generated according to the numeral data. Thereafter, the multiplication of the movement affine matrices Mwm, Mmw, Mm and the transformation matrix Mbw stored in the Mow storing section 94 is performed in the affine matrix calculation section 122 to produce the transformation matrix Mbw(new)=MbwMwmMmMmw. The transformation matrix Mbw(new) relates to the object B moved according to the numeral data and is stored in the Mow transformation matrix storing section 94 to replace the transformation matrix Mbw with the transformation matrix Mbw(new).

Thereafter, the transformation affine matrix Mab is calculated in the affine matrix calculation section 122 by multiplying the transformation matrix Maw stored in the Mow transformation matrix storing section 94 by the transformation matrix Mwb stored in the Mwo transformation matrix storing section 93 according to the equation (27). Thereafter, the transformation affine matrix Mab calculated is temporarily stored in the Mab matrix storing section 123. Thereafter, the transformation matrix Maw(new) is calculated in the affine matrix calculation section 122 by multiplying the transformation affine matrix Mab stored in the Mab matrix storing section 123 by the transformation matrix Mbw(new) stored in the Mow transformation matrix storing section 94 according to the equation (28). Thereafter, the transformation matrix Maw(new) is stored in the Mow storing section 94 to replace the matrix Maw with the matrix Maw(new).

Accordingly, because the transformation affine matrix Mab is calculated in advance of the calculation of the transformation matrix Maw(new) and is stored in the Mab matrix storing section 123, the calculation of movement matrices relating to the first object A is not required in the movement matrix generating section 98. That is, the transformation matrix Maw(new) can be calculated according to the equations (27), (28) so that the number of multiplications required to obtain the transformation matrix Maw(new) can be largely reduced. For example, the number of multiplications in the conventional apparatus sums up to 192 (64×3) because the transformation matrix Maw(new) is calculated according to the equation (2). However, the number of multiplications according to the present invention sums up to 128 (64×2).

Thereafter, the transformation matrices Maw(new), Mbw(new) are read out from the Mow storing section 94 to the inverse matrix calculating apparatus 51, 61, 71, or 81, and the inverse matrices Maw$^{-1}$(new), Mbw$^{-1}$(new) of the transformation matrices Maw(new), Mbw(new) are calculated as the transformation matrices Mwa(new), Mwb(new) according to the equations (29), (30). Thereafter, the transformation matrices Mwa, Mwb stored in the Mow storing section 94 are replaced with the inverse matrix Maw$^{-1}$(new), Maw$^{-1}$(new).

Accordingly, even though the first and second objects A, B are moved together in the virtual three-dimensional space while moving the shape prescribing coordinate systems Ca, Cb prescribing the shape of the objects A, B with the objects A, B, the transformation matrices Mwa, Mwb can be reliably rewritten at high speed because the inverse matrices Maw$^{-1}$(new), Mbw$^{-1}$(new) of the transformation matrices Maw(new), Mbw(new) are calculated as the transformation matrices Mwa(new), Mwb(new) in the inverse matrix calculating apparatus 51, 61, 71, or 81.

Thereafter, when the inter-object processing data is input to the input unit 95, the input of the inter-object processing data to the input unit 95 is detected by the input processing section 112. Therefore, the inter-object processing section 100 is operated to process the objects Ob2 including the object A or B, in the same manner as in the fifth embodiment. Thereafter, the shapes of the objects Ob2 processed are stored in the shape storing section 92.

Thereafter, when an instruction ordering to output the shapes of the objects Ob3 is input to the input unit 95, the shapes of the objects Ob3 are output to the output unit 114, and the shapes of the objects Ob3 are displayed in the display of the graphical work station.

Accordingly, because the transformation matrices Maw, and Mbw stored in the Mow storing section 94 are renewed at high speed resulting from the calculation of the transformation affine matrix Mab and because the transformation matrices Mwa, and Mwb stored in the Mwo storing section 93 are renewed at high speed in the inverse matrix calculating apparatus 51, 61, 71, or 81, the shapes of the objects Ob2 including the object A or B can be immediately changed while the objects relate to each other. Therefore, even though parts of the objects Ob2 is included in the objects Ob3, the shapes of the objects Ob3 can be immediately output.

Eighth Embodiment

In cases where a moving object and one or more stationary objects are processed according to an inter-object processing, it is difficult to process the moving and stationary objects in the world coordinate system Cw of the virtual three-dimensional space while considering positional relationships between the moving object and the stationary objects because axial directions of the world coordinate system Cw have no relation to the movement of the moving object. Therefore, in cases where a processing coordinate system Cp simplifying the movement of the moving object is additionally adopted to prescribe shapes of the moving and stationary objects, the processing of the objects can be performed at high speed.

Figure 13:
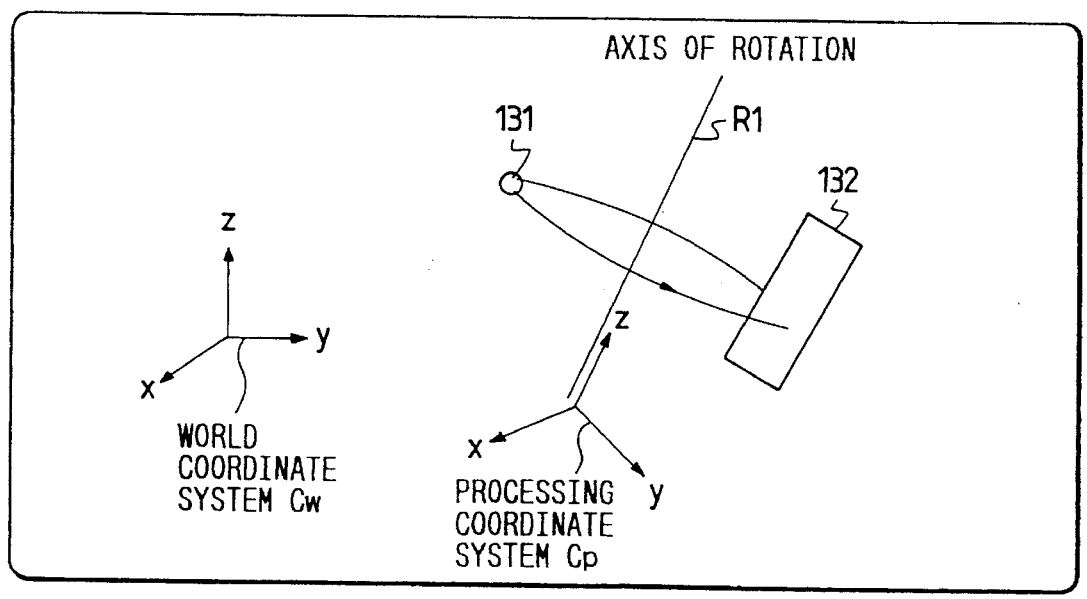
FIG. 13 shows a stationary object and a moving object displayed in a display as an example, the moving object colliding with the stationary object.

FIG. 13 shows a stationary object and a moving object displayed in a display as an example, the moving object colliding with the stationary object.

As shown in FIG. 13, a moving object 131 is rotated about an axis R1 of rotation and collides with a stationary object 132 according to an inter-object processing. The axis R1 of rotation is not parallel to any axis of the world coordinate system Cw. Therefore, in cases where positions of the moving object 131 and the stationary object 132 are prescribed in the world coordinate system Cw, it is difficult to determine a rotational angle θ of the moving object 131 at which the moving object 131 collides with the stationary object 132. Also, it is difficult to determine a colliding position P1 at which the moving object 131 and the stationary object 132 collide. However, in cases where a processing coordinate system Cp of which a z-axis agrees with the axis R1 of rotation is adopted to prescribe the moving object 131 and the stationary object 132 in the processing coordinate system Cp, it is easy to determine the rotational angle θ and the colliding position P1.

In an eighth embodiment, an idea that the processing coordinate system Cp is adopted to efficiently process a plurality of objects according to an inter-object processing is described.

Mathematical relational equations utilized in the eighth embodiment are described.

A transformation affine matrix Mop transforming the shape prescription system Co to the processing coordinate system Cp is obtained according to an equation (31).

$$Mop = MowMwp \tag{31}$$

Where the symbol Mwp denotes a transformation affine matrix transforming the world coordinate system Cw to the processing coordinate system Cp.

A transformation affine matrix Mpo transforming the processing coordinate system Cp to the shape prescribing system Co is obtained according to an equation (32).

$$Mpo = MpwMwo \tag{32}$$

Where the symbol Mpw denotes a transformation affine matrix transforming the processing coordinate system Cp to the world coordinate system Cw.

A shape vector Pp indicating the shape data of an object prescribed in the processing coordinate system Cp is obtained according to an equation (33).

$$Pp = PoMop \tag{33}$$

Where the symbol Po denotes a shape vector indicating the shape data of the object prescribed in the shape prescribing coordinate system Co. Also, another shape vector Po' equivalent to a shape vector obtained by processing the shape vector Po in the shape prescribing coordinate system Co is obtained according to an equation (34).

$$Po' = Pp'Mpo \tag{34}$$

Where the symbol Pp' denotes a shape vector obtained by processing the shape vector Pp in the processing coordinate system Cp.

Figure 14:
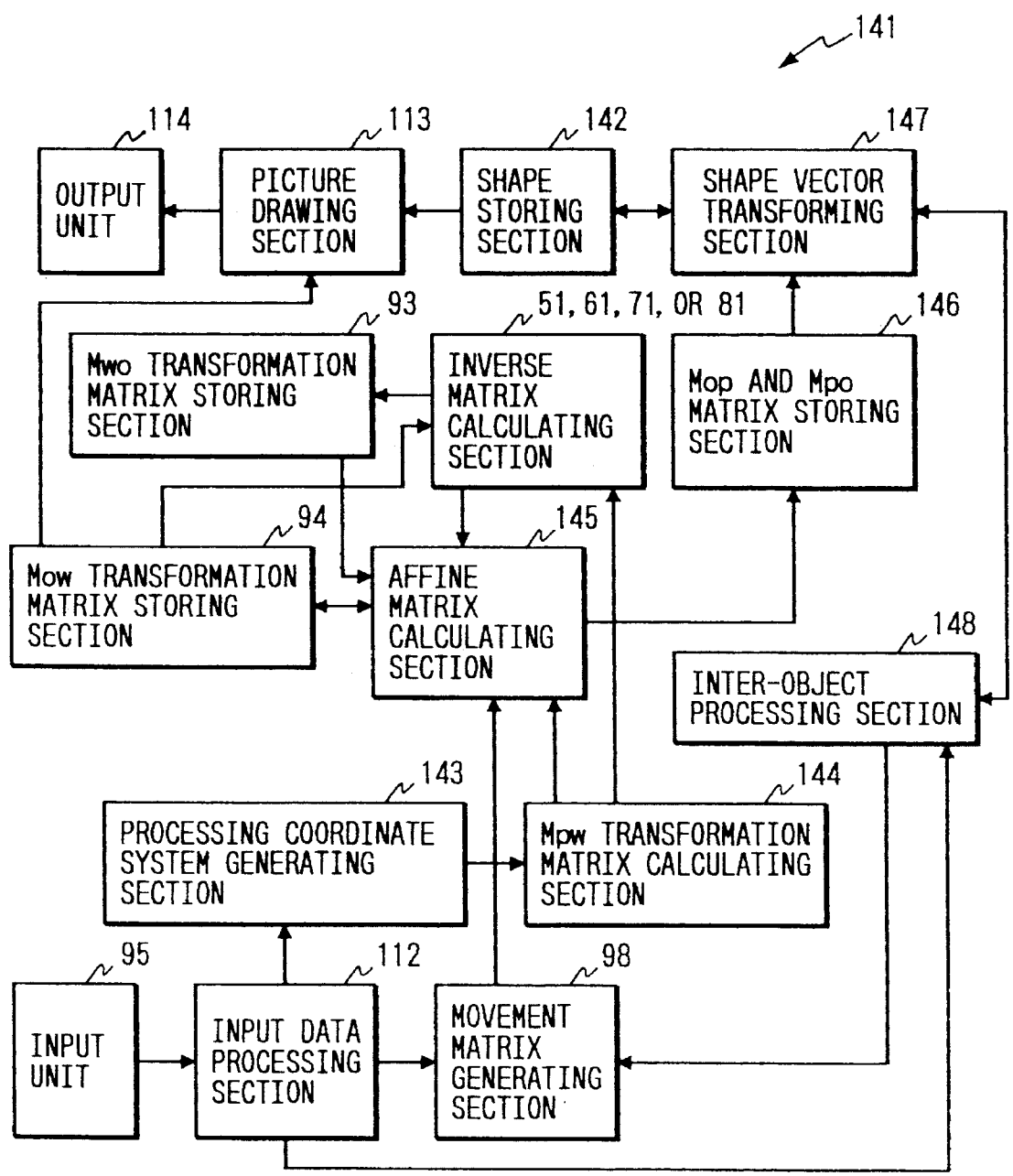
FIG. 14 is a block diagram of a three-dimensional object movement and transformation processing apparatus according to the eighth embodiment of the present invention.

FIG. 14 is a block diagram of a three-dimensional object movement and transformation processing apparatus according to the eighth embodiment of the present invention.

As shown in FIG. 14, a three-dimensional object movement and transformation processing apparatus 141 comprises a shape storing section 142 for storing a plurality of shape vectors of a plurality of objects prescribed in the shape prescription coordinate systems Co in a three dimensional space, the Mwo transformation matrix storing section 93, the Mow transformation matrix storing section 94, the input unit 95 for inputting pieces of numeral data designating an amount of movement and transformation of an object Ob1 and inputting a piece of inter-object processing data designating changes of shapes of the moving and stationary objects 131, 132 while relating the changes of the shapes to each other, the input processing section 112, the movement matrix generating section 98, a processing coordinate system generating section 143 for generating a processing coordinate system Cp according to the inter-object processing data processed in the input processing section 112, a Mpw transformation matrix calculating section 144 for calculating the transformation affine matrix Mpw by utilizing the world coordinate system Cw and the processing coordinate system Cp, the inverse matrix calculating apparatus 51, 61, 71, or 81 for calculating the inverse matrices Mow$^{-1}$, Mpw$^{-1}$ of the transformation affine matrices Mow, Mpw as the transformation affine matrices Mwo, Mwp, and an affine matrix calculating section 145 for calculating a transformation affine matrix Mow(new)=MowMwmMmMmw according to the numeral data by amplifying the affine matrices Mwm, Mmw, and Mm and a transformation affine matrix Mow which relates to the object Ob1 and is stored in the Mow transformation matrix storing section 94, replacing the transformation affine matrix Mow with the transformation affine matrix Mow(new), calculating the transformation affine affine matrices Mop, Mpo according to the equations (31), (32) by utilizing the transformation affine matrix Mpw calculated in the section 145 and the transformation affine matrix Mwp calculated in the apparatus 51, 61, 71, or 81. The shape vectors stored in the shape storing section 142 indicate shapes of the objects.

In the above configuration, when the numeral data are input to the input unit 95 to move the object Ob1, transformation affine matrices Mow(new), Mwo(new) relating to the object Ob1 are calculated in the affine matrix calculating section 145 and the inverse matrix calculating apparatus 51, 61, 71, or 81, in the same manner as in the fifth embodiment. Thereafter, the transformation affine matrices Mow, Mwo stored in the Mow and Mwo matrix storing sections 93, 94 are replaced with the the transformation affine matrices Mow(new), Mwo (new).

Thereafter, when the inter-object processing data is input to the input unit 95, the input of the inter-object processing data is detected by the input processing section 112. Therefore, the processing coordinate system Cp is generated in the processing coordinate system generating section 143 to simplify the movement of the moving object 131, and the transformation affine matrix Mpw is calculated in the Mpw transformation matrix calculating section 144 by utilizing the the processing coordinate system Cp calculated and the world coordinate system Cw. Thereafter, the transformation affine matrix Mpw calculated is transferred to the inverse matrix calculating apparatus 51, 61, 71, or 81 and the affine matrix calculating section 145. In the inverse matrix calculating apparatus 51, 61, 71, or 81, the transformation affine matrix Mwp is calculated and is transferred to the affine matrix calculating section 145. In the section 145, the transformation affine matrices Mop, Mpo relating to the objects 131, 132 are calculated according to the equations (31), (32) by utilizing the transformation affine matrices Mwp, Mpw calculated in the apparatus 51, 61, 71, or 81 and the section 144 and the transformation affine matrices Mow, Mwo stored in the storing sections 93, 94. The transformation affine matrices Mop, Mpo calculated is utilized to determine the rotational angle θ of the moving object 131 and the colliding position P1.

The apparatus 141 further comprises a Mop and Mpo matrix storing section 146 for temporarily storing the transformation affine matrices Mop, Mpo calculated in the affine matrix calculating section 145, a shape vector transforming section 147 for transforming both a shape vector $Po_1$ of the moving object 131 and a shape vector $Po_2$ of the stationary object 132 stored in the shape storing section 142 to a shape vector $Pp_1$ and a shape vector $Pp_2$ according to the equation (33) and for transforming shape vectors $Pp_1'$, $Pp_2'$ obtained by processing the shape vectors $Pp_1$, $Pp_2$ to shape vectors $Po_1'$, $Po_2'$ according to the equation (34), an inter-subject processing section 148 for determining the rotational angle θ and the colliding position P1 according to the inter-object processing data, transforming the shape vectors $Pp_1$, $Pp_2$ to the shape vectors $Po_1'$, $Po_2'$ in cases where the shapes of the moving and stationary objects 131, 132 are changed, and sending a piece of movement data specifying a movement of the stationary object 132 to the movement matrix generating section 98 to avoid an interaction between the moving and stationary objects 131, 132, the picture drawing section 113, and the output unit 114.

In the above configuration, the transformation affine matrices Mop stored in the Mop and Mpo matrix storing section 146 are transferred to the shape vector changing section 147, and the shape vectors $Po_1$, $Po_2$ of the moving and stationary objects 131, 132 stored in the shape storing section 142 are transferred to the shape vector transforming section 147. In the section 147, the shape vectors $Pp_1$, $Pp_2$ prescribed in the processing coordinate systems Cp are calculated according to the equation (31), and the shape vectors $Pp_1$, $Pp_2$ are transferred to the inter-subject processing section 148. In the section 148, the moving and stationary objects 131, 132 are processed in the processing coordinate system Cw according to the inter-object processing data.

Specifically, when the moving subject 131 is rotated about the z-axis of the processing coordinate system Cp according to the numeral data, it is checked whether or not the moving object 131 collides with the stationary object 132. Also, in cases where the moving object 131 collides with the stationary object 132, the rotational angle θ and the colliding position P1 are determined. In cases where a hole is, for example, opened at the colliding position P1 to change the shape of the stationary object 132 according to the inter-object processing data, the shape vector $Pp_2$ of the stationary object 132 is changed to the shape vector $Pp_2'$. Also, in cases where the shape of the moving object 131 is deformed, the shape vector $Pp_1$ of the moving object 131 is changed to the shape vector $Pp_1'$. The shape vectors $Pp_1'$, $Pp_2'$ are transferred to the shape vector transforming section 147 and are transformed to the shape vectors $Po_1'$, $Po_2'$ according to the equation (34) by utilizing the transformation affine matrices Mpo stored in the Mpo matrix storing section 146. Thereafter, the shape vectors $Po_1$, $Po_2$ stored in the shape storing section 142 are rewritten to the the shape vectors $Po_1'$, $Po_2'$.

In contrast, in cases where the stationary object 132 is moved to avoid the collision of the moving object 131 and the stationary object 132, the movement data specifying a movement of the stationary object 132 is transferred to the movement matrix generating section 98. Thereafter, the transformation affine matrices Mow(new), Mwo(new) relating to the stationary object 132 are calculated in the affine matrix calculating section 145 and the inverse matrix calculating apparatus 51, 61, 71, or 81, in the same manner as in the fifth embodiment. Thereafter, the transformation affine matrices Mow, Mwo stored in the Mow and Mwo storing sections 93, 94 are replaced with the the transformation affine matrices Mow(new), Mwo(new).

For example, in cases where the moving object 131 is a robot arm and the stationary object 132 is an obstacle, the stationary object 132 is moved away to avoid the collision between the robot arm and the obstacle. Also, in cases where the moving object 131 is a drill and the stationary object 132 is a processed material, the rotational angle θ of the drill and a drilling position P1 on the processed material are determined, and a hole is opened at the drilling position P1 on the drilling material. Thereafter, the shape of the processed material processed is stored in the shape storing section 142.

Thereafter, when an instruction ordering to output the shapes of the objects 131, 132 is input to the input unit 95, the shapes of the objects 131, 132 are output to the output unit 114, and the shapes of the objects 131, 132 are displayed in the display of the graphical work station.

Accordingly, because the processing coordinate system Cp is utilized to simplify the movement of the moving object 131, the movement of the moving object 131 can be performed at high speed. Also, in cases where the shapes of the moving and stationary objects 131, 132 are changed, the shape data of the objects 131, 132 stored in the shape storing section 142 can be easily changed because the processing and shape prescribing coordinate systems Cp, Co prescribing the shapes of the objects 131, 132 are transformed to each other in the shape vector transforming section 147. Also, in cases where the stationary object 132 is moved to avoid the interaction between the objects 131, 132, the stationary object 132 can be easily moved because the movement data of the stationary object 132 is sent to the movement matrix generating section 98.

Ninth Embodiment

In a ninth embodiment, a three-dimensional object movement and transformation apparatus applied to process the movement of a robot arm in a robot control is described.

Figure 15:
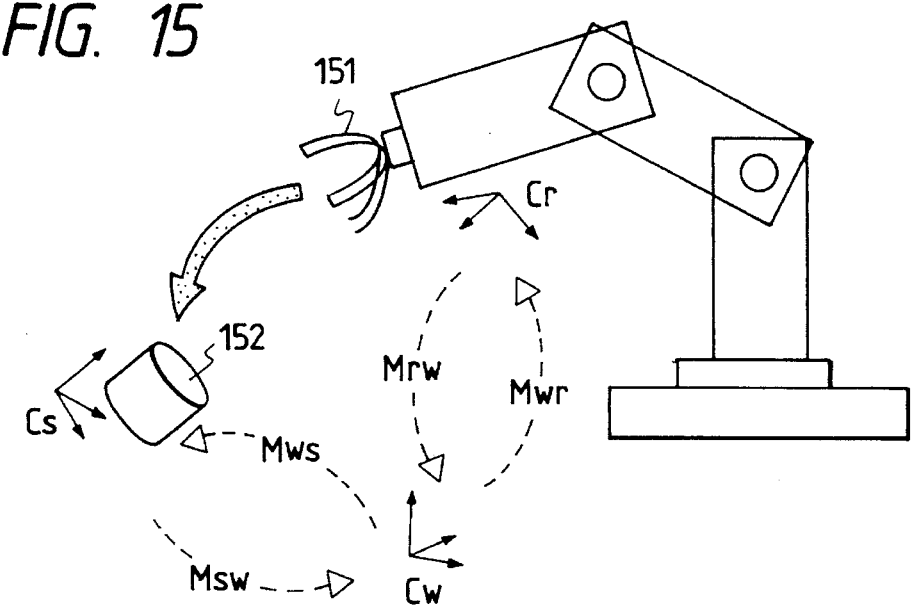
FIG. 15 schematically shows a robot arm moved to capture an object according to a ninth embodiment.

FIG. 15 schematically shows a robot arm moved to capture an object according to a ninth embodiment.

As shown in FIG. 15, a shape of a robot arm 151 is prescribed in a shape prescription coordinate system Cr, and a shape of a captured object 152 is prescribed in a shape prescription coordinate system Cs. To capture the captured object 152 with the robot arm 151, the robot arm 151 is moved to a position of the captured object 152 and is rotated to direct the robot arm 151 in a particular direction. Also, to smoothly operate the robot arm 151, it is required to automatically calculate an amount of movement of the robot arm 151. In this case, the robot arm 151 and the captured object 152 are prescribed in the same coordinate system. However, in cases where the robot arm 151 and the captured object 152 are prescribed in the world coordinate system Cw, the amount of movement required of the robot arm 151 to capture the captured object 151 cannot be directly found out because neither the position of the robot arm 151 nor the position of the captured object 152 expresses the amount of the movement. Therefore, the robot arm 151 and the captured object 152 are prescribed in the shape prescription coordinate system Cr in the ninth embodiment to directly find out the amount of the movement.

Because a matrix Msw denotes a transformation affine matrix transforming the shape prescription coordinate system Cs to the world coordinate system Cw and a matrix Mwr denotes a transformation affine matrix transforming the world coordinate system Cw to the shape prescription coordinate system Cr, a transformation affine matrix Msr transforming the shape prescription coordinate system Cs to the shape prescription coordinate system Cr is defined according to an equation (35).

$$Msr = MswMwr \tag{35}$$

Figure 16:
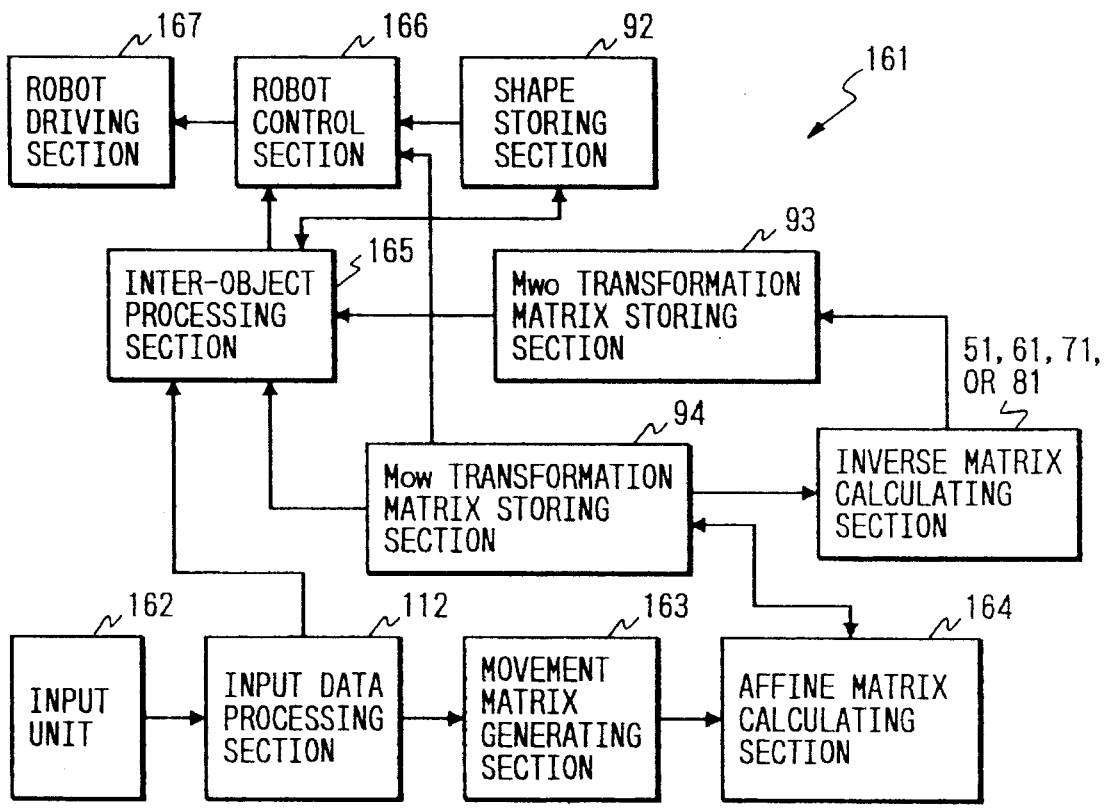
FIG. 16 is a block diagram of a three-dimensional object movement and transformation processing apparatus according to the ninth embodiment of the present invention.

FIG. 16 is a block diagram of a three-dimensional object movement and transformation processing apparatus according to the ninth embodiment of the present invention.

As shown in FIG. 16, a three-dimensional object movement and transformation processing apparatus 161 comprises the shape storing section 92, the Mwo transformation matrix storing section 93, the Mow transformation matrix storing section 94, an input unit 162 for inputting pieces of numeral data designating amounts of movement of the robot arm 151 and the captured object 152 and inputting a capture instruction to capture the captured object 152 with the robot arm 151, the input processing section 112, a movement matrix generating section 163 for generating affine matrices $Mwm_1$, $Mwm_2$, $Mmw_1$, $Mmw_2$ relating to the parallel translation of the robot arm 151 and the captured object 152 and affine matrices $Mm_1$, $Mm_2$ relating to the rotational motion of the robot arm 151 and the captured object 152 according to the numeral data input to the input section 162, an affine matrix calculating section 164 for calculating a transformation affine matrix Mrw(new)= $MrwMwm_1Mm_1Mmw_1$ by amplifying the affine matrices $Mwm_1$, $Mmw_1$, and $Mm_1$ and a transformation affine matrix Mrw which relates to the robot arm 151 and is stored in the Mow transformation matrix storing section 94, calculating a transformation affine matrix Msw(new)= $MswMwm_2Mm_2Mmw_2$ by amplifying the affine matrices $Mwm_2$, $Mmw_2$, and $Mm_2$ and a transformation affine matrix Msw which relates to the captured object 152 and is stored in the Mow transformation matrix storing section 94, and replacing the transformation affine matrices Mrw, Msw stored in the section 94 with the transformation affine matrix Mow(new), and the inverse matrix calculating apparatus 51, 61, 71, or 81 for calculating inverse matrices $Mrw^{-1}$, $Msw^{-1}$ of the transformation affine matrices Mrw, Msw as transformation affine matrices Mwr, Mws.

In the above configuration, when the numeral data are input to the input unit 162 to move the robot arm 151, the transformation affine matrix Mrw(new) relating to the robot arm 151 is calculated in the affine matrix calculating section 164, and a transformation affine matrix $Mrw^{-1}$(new) relating to the robot arm 151 is calculated as the transformation affine matrix Mwr(new) in the inverse matrix calculating apparatus 51, 61, 71, or 81, in the same manner as in the fifth embodiment. Thereafter, the transformation affine matrices Mrw, Mwr stored in the Mow and Mwo matrix storing sections 93, 94 are replaced with the the transformation affine matrices Mrw(new), Mwr(new). Also, when the numeral data are input to the input unit 162 to move the captured object 152, the transformation affine matrix Msw(new) relating to the captured object 152 is calculated in the affine matrix calculating section 164, and a transformation affine matrix $Msw^{-1}$(new) relating to the captured object 152 is calculated as the transformation affine matrix Mws(new) in the inverse matrix calculating apparatus 51, 61, 71, or 81, in the same manner as in the fifth embodiment. Thereafter, the transformation affine matrices Msw, Mws stored in the Mow and Mwo matrix storing sections 93, 94 are replaced with the transformation affine matrices Msw(new), Mws(new).

The apparatus 161 further comprises an inter-object processing section 165 for calculating an amount of movement required to capture the captured object 152 with the robot arm 151 according to the movement instruction, a robot control section 166 for generating a control signal which controls the movement of the robot arm 151 according to the amount of the movement, and a robot driving apparatus 167 for actually moving the robot arm 151 according to the control signal to capture the captured object 152.

In the above configuration, when the movement instruction is input to the input section 162, the input of the movement instruction is detected in the input processing section 112, and the movement instruction is transferred to the inter-object processing section 165. In the section 165, the transformation affine matrix Msr is calculated by multiplying the transformation affine matrix Msw(new) stored in the Mow matrix storing section 94 by the transformation affine matrix Mwr(new) stored in the Mwo matrix storing section 93 according to the equation (35). Thereafter, the shape of the captured object 152 stored in the shape storing section 92 is transferred to the inter-object processing section 165, and the shape of the captured object 152 prescribed in the shape prescription coordinate system Cs is transformed to the shape of the captured object 152 prescribed in the shape prescription coordinate system Cr by multiplying the transformation affine matrix Msr according to an equation (36).

$$Pr=PsMsr \qquad (36)$$

Where the symbol Pr denotes a shape vector designating the shape of the captured object 152 prescribed in the shape prescription coordinate system Cr, and the symbol Ps denotes a shape vector designating the shape of the captured object 152 prescribed in the shape prescription coordinate system Cs.

Because positional coordinates indicating the position of the captured object 152 in the shape prescription coordinate system Cr which prescribes the shape of the robot arm 151 is specified by the shape vector Pr, an amount of movement of the robot arm 151 required to capture the captured object 152 agrees with the shape vector Pr. Accordingly, an amount of parallel translation and an amount of rotational motion required of the robot arm 151 can be obtained.

Thereafter, a control signal is generated in the robot control section 166 according to the shape vector Pr to capture the captured object 152 with the robot arm 151, and the robot arm 151 is actually moved and rotated by the robot driving apparatus 167 according to the control signal. Therefore, the captured object 152 is actually captured by the robot arm 151.

Accordingly, because the matrices Mwr(new), Mrw(new) can be calculated in the inverse matrix calculating apparatus 51, 61, 71, or 81 at high speed, the robot arm 151 can be operated at high speed even though the robot arm 151 or the captured object 152 is moved before the robot arm 151 captures the captured object 152. Also, because the shape of the captured object 152 is prescribed in the shape prescription coordinate system Cr prescribing the shape of the robot arm 151, the amount of movement required of the robot arm 151 can be obtained at high speed. As a result, a capturing operation of the robot arm 151 can be performed at high speed.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A three-dimensional object movement and transformation processing apparatus, comprising:

shape storing means for storing shapes of a plurality of objects including a first object and a second object which are prescribed in shape prescription coordinate systems of a three-dimensional space;

Mwo matrix storing means for storing a plurality of transformation affine matrices Mwo which transform a world coordinate system of the three-dimensional space to the shape prescription coordinate systems prescribing the shapes of the objects stored in the shape storing means;

Mow matrix storing means for storing a plurality of transformation affine matrices Mow which transform the shape prescription coordinate systems prescribing the shapes of the objects stored in the shape storing means to the world coordinate system;

input means for inputting a piece of movement data designating an amount of a parallel translation, a rotational motion and an isotropic magnification or minification of the first object;

movement matrix generating means for generating movement matrices indicating the parallel translation, the rotational motion and the isotropic magnification or minification of the first object according to the movement data input to the input means;

affine matrix calculating means for calculating a transformation affine matrix Mow(new) relating to the first object moved or transformed according to the movement data by utilizing the movement matrices generated in the movement matrix generating means and a transformation affine matrix Mow which relates to the first object not moved nor transformed and is stored in the Mow matrix storing means, the transformation affine matrix Mow(new) being stored in the Mow matrix storing means to replace the transformation affine matrix Mow with the transformation affine matrix Mow(new);

an inverse matrix calculating apparatus for calculating an inverse matrix $Mow^{-1}(new)$ of the transformation affine matrix Mow(new) stored in the Mow matrix storing means, the inverse matrix calculating apparatus comprising affine matrix dividing means for dividing the transformation affine matrix Mow(new) into a minor matrix Q indicating the rotational motion and the isotropic magnification or minification of the first object and a position vector p indicating the parallel translation of the first object, transposed matrix calculating means for calculating a transposed matrix $Q^t$ of the minor matrix Q divided in the affine matrix dividing means, vector-matrix multiplying means for multiplying the position vector p divided in the affine matrix dividing means by the transposed matrix $Q^t$ calculated in the transposed matrix calculating means to produce a vector $pQ^t$ and changing a sign of the matrix $pQ^t$ to produce a multiplied vector $-pQ^t$, inner product calculating means for calculating a squared product of an absolute value of an axial vector composing the minor matrix Q as a squared rate of the isotropic magnification or minification, dividing means for dividing each of components of the transposed matrix $Q^t$ calculated in the transposed matrix calculating means and each of components of the multiplied vector $-pQ^t$ obtained in the vector-matrix multiplying means by the squared product calculated in the inner product calculating means, and inverse affine matrix arranging means for arranging the transposed matrix $Q^t$ divided by the squared product in the dividing means as a minor matrix of the inverse matrix $Mow^{-1}(new)$ and arranging the multiplied vector $-pQ^t$ divided by the squared product in the dividing means as a position vector of the inverse matrix $Mow^{-1}(new)$ to produce the inverse matrix $Mow^{-1}(new)$ having the minor matrix $Q^t$ divided by the squared product and the position vector $-pQ^t$ divided by the squared product, the inverse matrix $Mow^{-1}(new)$ being stored in the Mwo matrix storing means as a transformation affine matrix Mwo(new) relating to the first object moved or transformed to replace a transformation affine matrix Mwo which is stored in the Mwo matrix storing means and relates to the first object not moved nor transformed with the inverse matrix $Mow^{-1}(new)$;

inter-object processing means for transforming the shape prescription coordinate systems prescribing the shapes of the first and second objects stored in the shape storing means to the world coordinate system according to a transformation affine matrix Mow of the second object and the transformation affine matrix Mow(new) of the first object stored in the Mow matrix storing means, changing the shapes of the first and second objects prescribed in the world coordinate system to processed shapes while incorporating an inter-object relationship between the first and second objects in the processed shapes, transforming the world coordinate system prescribing the processed shapes of the first and second objects to the shape prescription coordinate systems of the first and second objects according to a transformation affine matrix Mwo of the second object and the transformation affine matrix Mwo(new) of the first object stored in the Mwo matrix storing means, and replacing the shapes of the first and second objects stored in the shape storing means with the processed shapes of the first and second objects prescribed in the shape prescription coordinate systems; and displaying means for displaying the processed shapes of the first and second objects stored in the shape storing means.

2. An apparatus according to claim 1, additionally including input processing means for judging whether a piece of input data input to the input means is the movement data or the inter-object processing data, the movement data judged being transferred to the movement matrix generating means, and the inter-object processing data judged being transferred to the inter-object processing means.

3. An apparatus according to claim 1, additionally including picture drawing means for drawing pictures of the first and second objects prescribed in the world coordinate system by utilizing the shapes of the first and second objects stored in the shape storing means and the transformation affine matrices Mow stored in the Mow matrix storing means, the pictures of the first and second objects being transferred to the displaying means.

4. An apparatus according to claim 1, additionally including control means for judging whether a piece of input data input to the input means is the movement data or the inter-object processing data and drawing pictures of the objects prescribed in the world coordinate system by utilizing the shapes of the first and second objects stored in the shape storing means and the transformation affine matrices Mow stored in the Mow matrix storing means, the movement data judged being transferred to the movement matrix generating means, the inter-object processing data judged being transferred to the inter-object processing means, and the pictures of the objects being transferred to the displaying means.

5. A three-dimensional object movement and transformation processing apparatus comprising:

shape storing means for storing shapes of a plurality of objects including a first object which are prescribed in shape prescription coordinate systems of a three-dimensional space;

Mwo matrix storing means for storing a plurality of transformation affine matrices Mwo which transform a world coordinate system of the three-dimensional space to the shape prescription coordinate systems prescribing the shapes of the objects stored in the shape storing mean;

Mow matrix storing means for storing a plurality of transformation affine matrices Mow which transform the shape prescription coordinate systems prescribing the shapes of the objects stored in the shape storing means to the world coordinate system;

input means for inputting a piece of movement data designating an amount of movement or transformation of the first object and inputting a piece of inter-object processing data designating changes of shapes of the first object and one or more second objects stored in the shape storing means while relating the changes of the shapes of the second objects to the change of the shape of the first object;

movement matrix generating means for generating movement matrices indicating the movement or transformation of the first object according to the movement data input to the input means;

affine matrix calculating means for calculating a transformation affine matrix Mow(new) relating to the first object moved or transformed according to the movement data by utilizing the movement matrices generated in the movement matrix generating means and a transformation affine matrix Mow which relates to the first object not moved nor transformed and is stored in the Mow matrix storing means, the transformation affine matrix Mow(new) being stored in the Mow matrix storing means to replace the transformation affine matrix Mow with the transformation affine matrix Mow(New);

a first inverse matrix calculating apparatus for calculating an inverse matrix $Mow^{-1}(new)$ of the transformation affine matrix Mow(new) stored in the Mow matrix storing means, the first inverse matrix calculating apparatus comprising first affine matrix dividing means for dividing the transformation affine matrix MOW(new) into a minor matrix Q indicating a linear transformation of the first object and a position vector p indicating a parallel translation of the first object, inverse matrix calculating means for calculating an inverse matrix $Q^{-1}$ of the minor matrix Q divided in the first affine matrix dividing means, first vector-matrix multiplying means for multiplying the position vector p divided in the first affine matrix dividing means by the inverse matrix $Q^{-1}$ calculated in the inverse matrix calculating means to produce a vector $pQ^{-1}$ and changing a sign of the matrix $pQ^{-1}$ to produce a multiplied vector $-pQ^{-1}$, and first inverse affine matrix arranging means for arranging the inverse matrix $Q^{-1}$ calculated in the inverse matrix calculating means as a minor matrix of the inverse matrix $Mow^{-1}$new) and arranging the multiplied vector $-pQ^{-1}$ produced in the first vector-matrix multiplying means as a position vector of the inverse matrix $Mow^{-1}$(new) to produce the inverse matrix $Mow^{-1}$(new) having the minor matrix $Q^{-1}$ and the position vector $-pQ^{-1}$, the inverse matrix $Mow^{-1}$(new) being stored in the Mwo matrix storing means as a transformation affine matrix Mow/new) relating to the first object moved or transformed to replace a transformation affine matrix Mwo which is stored in the Mwo matrix storing means and relates to the first object not moved nor transformed with the inverse matrix $Mow^{-1}$(new);

a second inverse matrix calculating apparatus for calculating a second inverse matrix $Mow^{-1}$(new) of the transformation affine matrix Mow(new) stored in the Mow matrix storing means, the second inverse matrix calculating apparatus comprising second affine matrix dividing means for dividing the transformation affine matrix Mow(new) into a minor matrix Q indicating a linear transformation of the first object and a position vector p indicating a parallel translation of the first object, first transposed matrix calculating means for calculating an transposed matrix $Q^t$ of the minor matrix Q divided in the second affine matrix dividing means, second vector-matrix multiplying means for multiplying the position vector p divided in the second affine matrix dividing means by the transposed matrix $Q^t$ calculated in the first transposed matrix calculating means to produce a vector $pQ^t$ and changing a sign of the matrix $pQ^1$ to produce a multiplied vector $-pQ^1$, and second inverse affine matrix arranging means for arranging the transposed matrix $Q^t$ calculated in the first transposed matrix calculating means as a minor matrix of the second inverse matrix $Mow^{-}$1(new) and arranging the multiplied vector $-pQ^t$ produced in the second vector-matrix multiplying means as a position vector of the second inverse matrix $Mow^{-1}$(new) to produce the second inverse matrix $Mow^{-1}$(new) having the minor matrix $Q^t$ and the position vector $-pQ^t$;

a third inverse matrix calculating apparatus for calculating a third inverse matrix $Mow^{-1}$(new) of the transformation affine matrix Mow(new) stored in the Mow matrix storing means, the third inverse matrix calculating apparatus comprising third affine matrix dividing means for dividing the transformation affine matrix Mow(new) into a minor matrix Q indicating a linear transformation of the first object and a position vector p indicating a parallel translation of the first object, second transposed matrix calculating means for calculating an transposed matrix $Q^t$ of the minor matrix Q divided in the third affine matrix dividing means, third vector-matrix multiplying means for multiplying the position vector p divided in the third affine matrix dividing means by the transposed matrix $Q^t$ calculated in the second transposed matrix calculating means to produce a vector $pQ^t$ and changing a sign of the matrix $pQ^t$ to produce a multiplied vector $-pQ^t$, inner product calculating means for calculating a squared product of an absolute value of an axial vector composing the minor matrix Q divided in the third affine matrix dividing means, dividing means for dividing each of components of the transposed matrix $Q^t$ calculated in the second transposed matrix calculating means and each of components of the multiplied vector $-pQ^t$ obtained in the third vector-matrix multiplying means by the squared product calculated in the inner product calculating means, third inverse affine matrix arranging means for arranging the transposed matrix $Q^t$ divided by the squared product in the dividing means as a minor matrix of the third inverse matrix $Mow^{-}$1(new) and arranging the multiplied vector $-pQ^t$ divided by the squared product in the dividing means as a position vector of the third inverse matrix $Mow^{-1}$(new); and demultiplexing means for transferring the transformation affine matrix Mow(new) stored in the Mow matrix storing means to the first inverse matrix calculating apparatus, the second inverse matrix calculating apparatus, or the third inverse matrix calculating apparatus according to the movement data input to the input means, the transformation affine matrix Mow(new) being transferred to the second inverse matrix calculating apparatus to send the second inverse matrix $Mow^{-1}$(new) arranged in the second inverse affine matrix arranging means to the Mwo matrix storing means as the transformation affine matrix Mwo(new) in cases where the movement or transformation of the first object designated by the movement data denotes both the parallel translation indicated by the position vector p and a rotational motion of the first object, the transformation affine matrix Mow(new) being transferred to the third inverse matrix calculating apparatus to send the third inverse matrix $Mow^{-1}$(new) arranged in the third inverse affine matrix arranging means to the Mwo matrix storing means as the transformation affine matrix Mwo(new) in cases where the movement or transformation of the first object designated by the movement data denotes the parallel translation indicated by the position vector p, a rotational motion of the first object, and an isotropic magnification or minification of the first object, and the transformation affine matrix Mow(new) being transferred to the first inverse matrix calculating apparatus in other cases to send the inverse matrix Mow$^{-1}$(new) arranged in the inverse affine matrix arranging means to the Mwo matrix storing means as the transformation affine matrix Mwo(new);

inter-object processing means for transforming the shape prescription coordinate systems prescribing the shapes of the first and second objects stored in the shape storing means to the world coordinate system by utilizing the transformation affine matrices Mow including the transformation affine matrix Mow(new) stored in the Mow matrix storing means, changing the shapes of the first and second objects prescribed in the world coordinate system to processed shapes of the first and second objects while relating the changes of the shapes of the second objects to the change of the shape of the first object according to the inter-object processing data input to the input means, transforming the world coordinate system prescribing the processed shapes of the first and second objects to the shape prescription coordinate systems by utilizing the transformation affine matrices Mwo including the transformation affine matrix Mwo(new) stored in the Mwo matrix storing means, and replacing the shapes of the first and second objects stored in the shape storing means with the processed shapes of the first and second objects prescribed in the shape prescription coordinate systems; and displaying means for displaying the processed shapes of the objects stored in the shape storing means.

6. A three-dimensional object movement and transformation processing apparatus, comprising:

shape storing means for storing shapes of a plurality of objects including first and second objects which are prescribed in shape prescription coordinate systems of a three-dimensional space;

Mwo matrix storing means for storing a plurality of transformation affine matrices Mwo which transform a world coordinate system of the three-dimensional space to the shape prescription coordinate systems prescribing the shapes of the objects stored in the shape storing means, a transformation affine matrix Mwa relating to the first object and a transformation affine matrix Mwb relating to the second object being stored in the Mwo matrix storing means;

Mow matrix storing means for storing a plurality of transformation affine matrices Mow which transform the shape prescription coordinate systems prescribing the shapes of the objects stored in the shape storing means to the world coordinate system, a transformation affine matrix Maw relating to the first object and a transformation affine matrix Mbw relating to the second object being stored in the Mow matrix storing means;

input means for inputting a piece of movement data designating an amount of a parallel translation, a rotational motion and an isotropic magnification or minification of the first and second objects, the first and second objects being moved together while maintaining a positional relationship between the first and second objects;

movement matrix generating means for generating movement matrices indicating the parallel translation, the rotational motion and the isotropic magnification or minification of the second object according to the movement data input to the input means;

affine matrix calculating means for calculating a transformation affine matrix Mbw(new) relating to the second object moved or transformed according to the movement data by utilizing the movement matrices generated in the movement matrix generating means and the transformation affine matrix Mbw stored in the Mow matrix storing means, calculating a transformation affine matrix Mab which transforms a shape prescription coordinate system Ca prescribing the first object to a shape prescription coordinate system Cb prescribing the second object by utilizing the transformation affine matrix Maw stored in the Mow matrix storing means and the transformation affine matrix Mwb stored in the Mwo matrix storing means, and calculating a transformation affine matrix Maw(new) relating to the first object moved or transformed according to the movement data by multiplying the transformation affine matrix Mab by the transformation affine matrix Mbw(new), the transformation affine matrices Maw(new), Mbw(new) being stored in the Mow matrix storing means to replace the transformation affine matrices Maw, Mbw with the transformation affine matrices Maw(new), Mbw(new);

an inverse matrix calculating apparatus for calculating inverse matrices Maw$^{-1}$(new), Mbw$^{-1}$(new) of the transformation affine matrices Maw(new), Mbw(new) stored in the Mow matrix storing means one after another, the inverse matrix calculating apparatus comprising affine matrix dividing means for dividing the transformation affine matrix Mow(new) representing the matrices Maw(new), Mbw(new) into a minor matrix Q indicating the rotational motion and the isotropic magnification or minification of the first or second object and a position vector p indicating the parallel translation of the first or second object, transposed matrix calculating means for calculating a transposed matrix $Q^t$ of the minor matrix Q divided in the affine matrix dividing means, vector-matrix multiplying means for multiplying the position vector p divided in the affine matrix dividing means by the transposed matrix $Q^t$ calculated in the transposed matrix calculating means to produce a vector $pQ^t$ and changing a sign of the matrix $pQ^t$ to produce a multiplied vector $-pQ^t$, inner product calculating means for calculating a squared product of an absolute value of an axial vector composing the minor matrix Q as a squared rate of the isotropic magnification or minification, dividing means for dividing each of components of the transposed matrix $Q^t$ calculated in the transposed matrix calculating means and each of components of the multiplied vector $-pQ^t$ obtained in the vector-matrix multiplying means by the squared product calculated in the inner product calculating means, and inverse affine matrix arranging means for arranging the transposed matrix $Q^t$ calculated in the transposed matrix calculating means as a minor matrix of an inverse matrix Mow$^{-1}$(new) of the transformation affine matrix Mow(new) and arranging the multiplied vector $-pQ^t$ divided by the squared product in the dividing means as a position vector of the inverse matrix Mow$^{-1}$(new) to produce the inverse matrix Mow$^{-1}$(new) having the minor matrix Q$^{-1}$ and the position vector -pQ$^t$, the inverse matrices Maw$^{-1}$(new), Mbw$^{-1}$(new) represented by the inverted matrix Mow$^{-1}$(new) being stored in the Mwo matrix storing means as transformation affine matrices Mwa(new), Mwb(new) relating to the first and second objects moved or transformed to replace the transformation affine matrices Mwa, Mwb stored in the Mwo matrix storing means with the inverse matrices Maw$^{-1}$(new), Mbw$^{-1}$(new);

picture drawing means for transforming the shape prescription coordinate systems prescribing the shapes of the first and second objects stored in the shape storing means to the world coordinate system according to the transformation affine matrices Maw(new), Mbw(new) stored in the Mow matrix storing means and drawing pictures of the first and second objects prescribed in the world coordinate system; and displaying means for displaying the pictures of the first and second objects drawn in the picture drawing means.

7. An apparatus according to claim 6, additionally including Mab matrix storing means for storing the transformation affine matrix Mab calculated in the affine matrix calculating means, the transformation affine matrix Mab stored in the Mab matrix storing means being utilized for the calculation of transformation affine matrix Maw(new) performed in the affine matrix calculating means.

8. An apparatus according to claim 6, additionally including input processing means for judging whether a piece of input data input to the input means is the movement data or the inter-object processing data, the movement data judged being transferred to the movement matrix generating means, and the inter-object processing data judged being transferred to the inter-object processing means.

9. An apparatus according to claim 6, additionally including picture drawing means for drawing pictures of the objects prescribed in the world coordinate system by utilizing the shapes of the objects stored in the shape storing means and the transformation affine matrices Mow stored in the Mow matrix storing means, the pictures of the objects being transferred to the displaying means.

10. A three-dimensional object movement and transformation processing apparatus comprising:

shape storing means for storing shapes of a plurality of objects including first and second objects which are prescribed in shape prescription coordinate systems of a three-dimensional space;

Mwo matrix storing means for storing a plurality of transformation affine matrices Mwo which transform a world coordinate system of the three-dimensional space to the shape prescription coordinate systems prescribing the shapes of the objects stored in the shape storing means, a transformation affine matrix Mwa relating to the first object and a transformation affine matrix Mwb relating to the second object being stored in the Mwo matrix storing means;

Mow matrix storing means for storing a plurality of transformation affine matrices Mow which transform the shape prescription coordinate systems prescribing the shapes of the objects stored in the shape storing means to the world coordinate system, a transformation affine matrix Maw relating to the first object and a transformation affine matrix Mbw relating to the second object being stored in the Mow matrix storing means;

input means for inputting a piece of movement data designating an amount of movement or transformation of the first and second objects and inputting a piece of inter-object processing data designating changes of shapes of the objects stored in the shape storing means while relating the changes of the shapes to each other, the first and second objects being moved together while maintaining a positional relationship between the first and second objects;

movement matrix generating means for generating movement matrices indicating the movement or transformation of the second object according to the movement data input to the input means;

affine matrix calculating means for calculating a transformation affine matrix Mbw(new) relating to the second object moved or transformed according to the movement data by utilizing the movement matrices generated in the movement matrix generating means and the transformation affine matrix Mbw stored in the Mow matrix storing means, calculating a transformation affine matrix Mab which transforms a shape prescription coordinate system Ca prescribing the first object to a shape prescription coordinate system Cb prescribing the second object by utilizing the transformation affine matrix Maw stored in the Mow matrix storing means and the transformation affine matrix Mwb stored in the Mwo matrix storing means, and calculating a transformation affine matrix Maw(new) relating to the first object moved or transformed according to the movement data by multiplying the transformation affine matrix Mab by the transformation affine matrix Mbw(new), the transformation affine matrices Maw(new), Mbw(new) being stored in the Mow matrix staring means to replace the transformation affine matrices Maw, Mbw with the transformation affine matrices Maw(new), Mbw(new);

a first inverse matrix calculating apparatus for calculating inverse matrices Maw$^{-1}$(new), Mb$^{-1}$(new) of the transformation affine matrices MaW(new), Mbw(new) stored in the Mow matrix storing means one after another, the inverse matrix calculating apparatus comprising first affine matrix dividing means for dividing the transformation affine matrix Mow(new) representing the matrices Maw/new), Mbw(new) into a minor matrix Q indicating a linear transformation of the first or second object and a position vector p indicating a parallel translation of the first or second object, inverse matrix calculating means for calculating an inverse matrix Q$^{-1}$ of the minor matrix Q divided in the first affine matrix dividing means, first vector-matrix multiplying means for multiplying the position vector p divided in the first affine matrix dividing means by the inverse matrix Q$^{-1}$ calculated in the inverse matrix calculating means to produce a vector pQ$^{-1}$ and changing a sign of the matrix pQ$^{-1}$ to produce a multiplied vector -pQ$^{-1}$, and first inverse affine matrix arranging means for arranging the inverse matrix Q$^{-1}$ calculated in the inverse matrix calculating means as a minor matrix of an inverse matrix Mow$^{-1}$(new) of the transformation affine matrix Mow(new) and arranging the multiplied vector -pQ$^{-1}$ produced in the first vector-matrix multiplying means as a position vector of the inverse matrix Mow$^{-1}$(new) to produce the inverse matrix Mow$^{-1}$(new) having the minor matrix Q$^{-1}$ and the position vector $-pQ^{-1}$, the inverse matrices $Maw^{-1}(new)$, $Mbw^{-1}(new)$ represented by the inverted matrix $Mow^{-1}(new)$ being stored in the Mwo matrix storing means as transformation affine matrices Mwa(new), Mwb(new) relating to the first and second objects moved or transformed to replace the transformation affine matrices Mwa, Mwb stored in the Mwo matrix storing means with the inverse matrices $Maw^{-1}(new)$, $Mbw^{-1}(new)$;

a second inverse matrix calculating apparatus for calculating a second inverse matrices $Maw^{-1}(new)$, $Mbw^{-1}(new)$ of the transformation affine matrices Maw(new), Mbw(new) stored in the Mow matrix storing means one after another, the second inverse matrix calculating apparatus comprising second affine matrix dividing means for dividing the transformation affine matrix Mow(new) (Maw(new) or Mbw(new)) relating to the first or second object into a minor matrix Q indicating a linear transformation of the first or second object and a position vector p indicating a parallel translation of the first or second object, first transposed matrix calculating means for calculating an transposed matrix $Q^t$ of the minor matrix Q divided in the second affine matrix dividing means, second vector-matrix multiplying means for multiplying the position vector p divided in the second affine matrix dividing means by the transposed matrix $Q^t$ calculated in the first transposed matrix calculating means to produce a vector $pQ^t$ and changing a sign of the matrix $pQ^t$ to produce a multiplied vector $-pQ^t$, and second inverse affine matrix arranging means for arranging the transposed matrix $Q^t$ calculated in the first transposed matrix calculating means as a minor matrix of the second inverse matrix $Mow^{-1}$ and arranging the multiplied vector $-pQ^t$ produced in the second vector-matrix multiplying means as a position vector of the second inverse matrix $Mow^{-1}$ to produce the second inverse matrix $Mow^{-1}$ having the minor matrix $Q^t$ and the position vector $pQ^t$;

a third inverse matrix calculating apparatus for calculating a third inverse matrices $Maw^{-1}(new)$, $Mbw^{-1}(new)$ of the transformation affine matrices Maw(new), Mbw(new) stored in the Mow matrix storing means one after another, the third inverse matrix calculating apparatus comprising third affine matrix dividing means for dividing the transformation affine matrix Mow(new) (Maw(new) or Mbw(new)) relating to the first or second object into a minor matrix Q indicating a linear transformation of the first or second object and a position vector p indicating a parallel translation of the first or second object, second transposed matrix calculating means for calculating an transposed matrix $Q^t$ of the minor matrix Q divided in the third affine matrix dividing means, third vector-matrix multiplying means for multiplying the position vector p divided in the third affine matrix dividing means by the transposed matrix $Q^t$ calculated in the second transposed matrix calculating means to produce a vector $pQ^t$ and changing a sign of the matrix $pQ^t$ to produce a multiplied vector $-pQ^t$, inner product calculating means for calculating a squared product of an absolute value of an axial vector composing the minor matrix Q divided in the third affine matrix dividing means, dividing means for dividing each of components of the transposed matrix $Q^t$ calculated in the second transposed matrix calculating means and each of components of the multiplied vector $-pQ^t$ obtained in the third vector-matrix multiplying means by the squared product calculated in the inner product calculating means, third inverse affine matrix arranging means for arranging the transposed matrix $Q^t$ divided by the squared product in the dividing means as a minor matrix of the third inverse matrix $Mow^{-1}$ and arranging the multiplied vector $-pQ^t$ divided by the squared product in the dividing means as a position vector of the third inverse matrix $Mow^{-1}$;

demultiplexing means for transferring the transformation affine matrices Maw(new), Mbw(new) stored in the Mow matrix storing means to the first inverse matrix calculating apparatus, the second inverse matrix calculating apparatus, or the third inverse matrix calculating apparatus according to the movement data input to the input means, the transformation affine matrices Maw(new), Mbw(new) being transferred to the second inverse matrix calculating apparatus to send the second inverse matrices $Maw^{-1}(new)$, $Mbw^{-1}(new)$ arranged in the second inverse affine matrix arranging means to the Mwo matrix storing means as the transformation affine matrices Mwa(new), Mwb(new) in cases where the movement or transformation of the first or second object designated by the movement data denotes both the parallel translation indicated by the position vector p and a rotational motion of the first or second object, the transformation affine matrices Maw(new), Mbw (new) being transferred to the third inverse matrix calculating apparatus to send the third inverse matrices $Maw^{-1}(new)$, $Mbw^{-1}(new)$ arranged in the third inverse affine matrix arranging means to the Mwo matrix storing means as the transformation affine matrices Mwa(new), Mwb(new) in cases where the movement or transformation of the first or second object designated by the movement data denotes the parallel translation indicated by the position vector p, a rotational motion of the first or second object, and an isotropic magnification or minification of the first or second object, and the transformation affine matrices Maw(new), Mbw(new) being transferred to the first inverse matrix calculating apparatus in other cases to send the inverse matrices $Maw^{-1}(new)$, $Mbw^{-1}(new)$ arranged in the inverse affine matrix arranging means to the Mwo matrix storing means as the transformation affine matrices Mwa(new), Mwb(new);

inter-object processing means for transforming the shape prescription coordinate systems prescribing the shapes of the objects stored in the shape storing means to the world coordinate system by utilizing the transformation affine matrices Mow including the transformation affine matrices Maw(new), Mbw(new) stored in the Mow matrix storing means, changing the shapes of the objects prescribed in the world coordinate system to processed shapes of the objects while relating the changes of the shapes to each other according to the inter-object processing data input to the input means, transforming the world coordinate system prescribing the processed shapes of the objects to the shape prescription coordinate systems by utilizing the transformation affine matrices Mwo including the transformation affine matrices Mwa(new), Mwb(new) stored in the Mwo matrix storing means, and replacing the shapes of the objects stored in the shape storing means with the processed shapes of the objects prescribed in the shape prescription coordinate systems; and displaying means for displaying the processed shapes of the objects stored in the shape storing means.

11. A three-dimensional object movement and transformation processing apparatus, comprising:

shape vector storing means for storing shape vectors Po of a plurality of objects including first and second objects which are prescribed in shape prescription coordinate systems of a three-dimensional space, the shape vectors Po of the objects indicating shapes of the objects;

Mwo matrix storing means for storing a plurality of transformation affine matrices Mwo which transform a world coordinate system of the three-dimensional space to the shape prescription coordinate systems prescribing the shapes of the objects stored in the shape vector storing means;

Mow matrix storing means for storing a plurality of transformation affine matrices Mow which transform the shape prescription coordinate systems prescribing the shapes of the objects stored in the shape vector storing means to the world coordinate system;

input means for inputting a piece of movement data designating an amount of a parallel translation, a rotational motion and an isotropic magnification or minification of the first object and inputting a piece of inter-object processing data designating both movement of the second object and changes of shapes of the objects stored in the shape vector storing means while relating the changes of the shapes to each other, the changes of the shapes being caused by the movement of the second object;

movement matrix generating means for generating movement matrices indicating the parallel translation, the rotational motion and the isotropic magnification or minification of the first object according to the movement data input to the input means;

processing coordinate system generating means for generating a processing coordinate system according to the inter-object processing data input to the input means to simplify the movement of the second object by prescribing the shape of the second object in the processing coordinate system;

Mpw matrix calculating means for calculating a transformation affine matrix Mpw transforming the processing coordinate system generated in the processing coordinate system generating means to the world coordinate system;

an inverse matrix calculating apparatus for calculating an inverse matrix $Mow^{-1}$ of the transformation affine matrix Mow stored in the Mow matrix storing means and calculating an inverse matrix Mwp of the matrix Mpw calculated in the Mpw matrix calculating means, the inverse matrix calculating apparatus comprising affine matrix dividing means for dividing the transformation affine matrix Mow, or Mpw into a minor matrix Q indicating the rotational motion and the isotropic magnification or minification of the first object and a position vector p indicating the parallel translation of the first object, transposed matrix calculating means for calculating an transposed matrix $Q^t$ of the minor matrix Q divided in the affine matrix dividing means, vector-matrix multiplying means for multiplying the position vector p divided in the affine matrix dividing means by the transposed matrix $Q^t$ calculated in the transposed matrix calculating means to produce a vector $pQ^t$ and changing a sign of the matrix $pQ^t$ to produce a multiplied vector $-pQ^t$, inner product calculating means for calculating a squared product s*s of an absolute value of an axial vector composing the minor matrix Q divided in the affine matrix dividing means as a squared rate of the isotropic magnification or minification, the absolute value of the axial vector being set to 1 in the transformation affine matrix Mpw, dividing means for dividing each of components of the transposed matrix $Q^t$ calculated in the transposed matrix calculating means and each of components of the multiplied vector $-pQ^t$ obtained in the vector-matrix multiplying means by the squared product s*s calculated in the inner product calculating means, and inverse affine matrix arranging means for arranging the transposed matrix $Q^t/(s*s)$ divided by the squared product s*s in the dividing means as a minor matrix of the inverse matrix $Mow^{-1}$, or Mwp and arranging the multiplied vector $-pQ^t/(s*s)$ divided by the squared product s*s in the dividing means as a position vector of the inverse matrix $Mow^{-1}$, or Mwp to produce the inverse matrix $Mow^{-1}$, or Mwp having the minor matrix $Q^t/(s*s)$ and the position vector $-pQ^t/(s*s)$;

affine matrix calculating means for calculating a transformation affine matrix Mow(new) relating to the first object moved or transformed according to the movement data input to the input means by utilizing the movement matrices generated in the movement matrix generating means and a transformation affine matrix Mow which relates to the first object and is stored in the Mow matrix storing means, calculating transformation affine matrices Mop transforming the shape prescription systems to the processing coordinate system by utilizing the matrices Mow stored in the Mow matrix storing means and the inverse matrix Mwp calculated in the inverse matrix calculating apparatus, and calculating transformation affine matrices Mpo transforming the processing coordinate system to the shape prescription systems by utilizing the transformation affine matrix Mpw calculated in the Mpw matrix calculating means and the matrices Mwo stored in the Mwo matrix storing means, the transformation affine matrix Mow(new) being stored in the Mow matrix storing means to replace the transformation affine matrix Mow stored in the Mow matrix storing means with the transformation affine matrix Mow(new), and an inverse matrix Mow$^{-1}$(new) of the transformation affine matrix Mow(new) stored in the Mow matrix storing means being calculated as a transformation affine matrix Mwo(new) in the inverse matrix calculating apparatus to replace a transformation affine matrix Mwo which relates to the first object and is stored in the Mwo matrix storing means with the transformation affine matrix Mwo(new);

Mop and Mpo matrix storing means for storing the transformation affine matrices Mop, Mpo calculated in the affine matrix calculating means;

shape vector transforming means for transforming the shape vectors Po of the objects stored in the shape vector storing means to transformed shape vectors Pp of the objects prescribed in the processing coordinate system by utilizing the transformation affine matrices Mop stored in the Mop and Mpo matrix storing means;

inter-object processing means for changing the transformed shape vectors Pp of the objects transformed in the shape vector transforming means to processed/transformed shape vectors Pp' of the objects while relating the changes of the transformed shape vectors Pp to each other according to the inter-object processing data input to the input means, the processed/transformed shape vectors Pp' of the objects being transformed to processed shape vectors Po' of the objects prescribed in the shape prescribing coordinate systems in the shape vector transforming means by utilizing the transformation affine matrices Mpo stored in the Mop and Mpo matrix storing means, and the processed shape vectors Po' of the objects being stored in the shape vector storing means to replace the shape vectors Po of the objects with the processed shape vectors Po' of the objects; and displaying means for displaying the processed shape vectors Po' of the objects stored in the shape vector storing means.

12. An apparatus according to claim 11, additionally including input processing means for judging whether a piece of input data input to the input means is the movement data or the inter-object processing data, the movement data judged being transferred to the movement matrix generating means, and the inter-object processing data judged being transferred to the inter-object processing means.

13. An apparatus according to claim 11, additionally including picture drawing means for drawing pictures of the objects prescribed in the world coordinate system by utilizing the shape vectors of the objects stored in the shape storing means and the transformation affine matrices Mow stored in the Mow matrix storing means, the pictures of the objects being transferred to the displaying means.

14. An apparatus according to claim 11 in which a movement instruction is transferred from the inter-object processing means to the movement matrix generating means to move an object, transformation affine matrices Mwo, Mow which relate to the object and are stored in the Mwo matrix storing means and the Mow matrix storing means being rewritten.

15. An apparatus according to claim 11 in which the movement of the second object designated by the inter-object processing data in the input means is a rotational movement in which the second object is rotated about a rotational axis, and the processing coordinate system generated in the processing coordinate system generating system has a coordinate axis agreeing with the rotational axis of the rotational motion.

16. A three-dimensional object movement and transformation processing apparatus, comprising:

shape vector storing means for storing shape vectors Po of a plurality of objects including first and second objects which are prescribed in shape prescription coordinate systems of a three-dimensional space, the shape vectors Po of the objects indicating shapes of the objects;

Mwo matrix storing means for storing a plurality of transformation affine matrices Mwo which transform a world coordinate system of the three-dimensional space to the shape prescription coordinate systems prescribing the shapes of the objects stored in the shape vector storing means;

Mow matrix storing means for storing a plurality of transformation affine matrices Mow which transform the shape prescription coordinate systems prescribing the shapes of the objects stored in the shape vector storing means to the world coordinate system;

input means for inputting a piece of movement data designating an amount of movement or transformation of the first object and inputting a piece of inter-object processing data designating both movement of the second object and changes of shapes of the objects stored in the shape vector storing means while relating the changes of the shapes to each other, the changes of the shapes being caused by the movement of the second object;

movement matrix generating means for generating movement matrices indicating the movement or transformation of the first object according to the movement data input to the input means;

processing coordinate system generating means for generating a processing coordinate system according to the inter-object processing data input to the input means to simplify the movement of the second object by prescribing the shape of the second object in the processing coordinate system;

Mpw matrix calculating means for calculating a transformation affine matrix Mpw transforming the processing coordinate system generated in the processing coordinate system generating means to the world coordinate system;

an inverse matrix calculating apparatus for calculating an inverse matrix Mow$^{-1}$ of the transformation affine matrix Mow stored in the Mow matrix storing means and calculating an inverse matrix Mwp of the matrix Mpw calculated in the Mpw matrix calculating means, the inverse matrix calculating apparatus comprising a general affine inverse matrix calculator comprising affine matrix dividing means for dividing the transformation affine matrix Mow, or Mpw into a minor matrix Q indicating a linear transformation of the first object and a position vector p indicating a parallel translation of the first object, inverse matrix calculating means for calculating an inverse matrix Q$^{-1}$ of the minor matrix Q divided in the affine matrix dividing means, vector-matrix multiplying means for multiplying the position vector p divided in the affine matrix dividing means by the inverse matrix Q$^{-1}$ calculated in the inverse matrix calculating means to produce a vector pQ$^{-1}$ and changing a sign of the matrix pQ$^{-1}$ to produce a multiplied vector -pQ$^{-1}$, and inverse affine matrix arranging means for arranging the inverse matrix Q$^{-1}$ calculated in the inverse matrix calculating means as a minor matrix of the inverse matrix $Mow^{-1}$, or Mwp and arranging the multiplied vector $-pQ^{-1}$ produced in the vector-matrix multiplying means as a position vector of the inverse matrix $Mow^{-1}$, or Mwp to produce the inverse matrix $Mow^{-1}$, or Mwp having the minor matrix $Q^{-1}$ and the position vector $-pQ^{-1}$, a rotational movement affine inverse matrix calculator comprising affine matrix dividing means for dividing the transformation affine matrix Mow, or Mpw into a minor matrix Q indicating a linear transformation of the first object and a position vector p indicating a parallel translation of the first object, the linear transformation indicated by the minor matrix Q denoting a rotational motion according to the movement data input to the input means, transposed matrix calculating means for calculating an transposed matrix $Q^t$ of the minor matrix Q divided in the affine matrix dividing means, vector-matrix multiplying means for multiplying the position vector p divided in the affine matrix dividing means by the transposed matrix $Q^t$ calculated in the transposed matrix calculating means to produce a vector $pQ^t$ and changing a sign of the matrix $pQ^t$ to produce a multiplied vector $pQ^t$, and inverse affine matrix arranging means for arranging the transposed matrix $Q^t$ calculated in the transposed matrix calculating means as a minor matrix of the inverse matrix $Mow^{-1}$, or Mwp and arranging the multiplied vector $-pQ^t$ produced in the vector-matrix multiplying means as a position vector of the inverse matrix $Mow^{-1}$, or Mwp to produce the inverse matrix $Mow^{-1}$, or Mwp having the minor matrix $Q^t$ and the position vector $-pQ^t$, a rotational movement and transformation affine inverse matrix calculator comprising affine matrix dividing means for dividing the transformation affine matrix Mow, or Mpw into a minor matrix Q indicating a linear transformation of the first object and a position vector p indicating a parallel translation of the first object, the linear transformation indicated by the minor matrix Q denoting a rotational motion and an isotropic magnification or minification according to the movement data input to the input means, transposed matrix calculating means for calculating an transposed matrix $^tQ$ of the minor matrix Q divided in the affine matrix dividing means, vector-matrix multiplying means for multiplying the position vector p divided in the affine matrix dividing means by the transposed matrix $Q^t$ calculated in the transposed matrix calculating means to produce a vector $pQ^t$ and changing a sign of the matrix $pQ^t$ to produce a multiplied vector $-pQ^t$, inner product calculating means for calculating a squared product $s*s$ of an absolute value of an axial vector composing the minor matrix Q divided in the affine matrix dividing means as a squared rate of the isotropic magnification or minification, the absolute value of the axial vector being set to 1 in the transformation affine matrix Mpw, dividing means for dividing each of components of the transposed matrix $Q^t$ calculated in the transposed matrix calculating means and each of components of the multiplied vector $-pQ^t$ obtained in the vector-matrix multiplying means by the squared product $s*s$ calculated in the inner product calculating means, and inverse affine matrix arranging means for arranging the transposed matrix $Q^t/(s*s)$ divided by the squared product $s*s$ in the dividing means as a minor matrix of the inverse matrix $Mow^{-1}$, or Mwp and arranging the multiplied vector $-pQ^t/(s*s)$ divided by the squared product $s*s$ in the dividing means as a position vector of the inverse matrix $Mow^{-1}$, or Mwp to produce the inverse matrix $Mow^{-1}$, or Mwp having the minor matrix $Q^t/(s*s)$ and the position vector $pQ^t/(s*s)$;

demultiplexing means for transferring the transformation affine matrices Mow, Mpw to the general affine inverse matrix calculator, the rotational movement affine inverse matrix calculator, or the rotational movement and transformation affine inverse matrix calculator according to the movement data input to the input means, the transformation affine matrices Mow, Mpw being transferred to the rotational movement affine inverse matrix calculator to selectively operate the rotational movement affine inverse matrix calculator in cases where the movement or transformation of the first object designated by the movement data denotes both the parallel translation indicated by the position vector p and the rotational motion of the first object, the transformation affine matrices Mow, Mpw being transferred to the rotational movement and transformation affine inverse matrix calculator to selectively operate the rotational movement and transformation affine inverse matrix calculator in cases where the movement or transformation of the first object designated by the movement data denotes the parallel translation indicated by the position vector p, the rotational motion of the first object, and the isotropic magnification or minification of the first object, and the transformation affine matrices Mow, Mpw being transferred to the general affine inverse matrix calculator to selectively operate the general affine inverse matrix calculator in other cases;

affine matrix calculating means for calculating a transformation affine matrix Mow(new) relating to the first object moved or transformed according to the movement data input to the input means by utilizing the movement matrices generated in the movement matrix generating means and a transformation affine matrix Mow which relates to the first object and is stored in the Mow matrix storing means, calculating transformation affine matrices Mop transforming the shape prescription systems to the processing coordinate system by utilizing the matrices Mow stored in the Mow matrix storing means and the inverse matrix Mwp calculated in the inverse matrix calculating apparatus, and calculating transformation affine matrices Mpo transforming the processing coordinate system to the shape prescription systems by utilizing the transformation affine matrix Mpw calculated in the Mpw matrix calculating means and the matrices Mwo stored in the Mwo matrix storing means, the transformation affine matrix Mow(new) being stored in the Mow matrix storing means to replace the transformation affine matrix Mow stored in the Mow matrix storing means with the transformation affine matrix Mow(new), and an inverse matrix Mow$^{-1}$(new) of the transformation affine matrix Mow(new) stored in the Mow matrix storing means being calculated as a transformation affine matrix Mwo(new) in the inverse matrix calculating apparatus to replace a transformation affine matrix Mwo which relates to the first object and is stored in the Mwo matrix storing means with the transformation affine matrix Mwo(new);

Mop and Mpo matrix storing means for storing the transformation affine matrices Mop, Mpo calculated in the affine matrix calculating means;

shape vector transforming means for transforming the shape vectors Po of the objects stored in the shape vector storing means to transformed shape vectors Pp of the objects prescribed in the processing coordinate system by utilizing the transformation affine matrices Mop stored in the Mop and Mpo matrix storing means;

inter-object processing means for changing the transformed shape vectors Pp of the objects transformed in the shape vector transforming means to processed/transformed shape vectors Pp' of the objects while relating the changes of the transformed shape vectors Pp to each other according to the inter-object processing data input to the input means, the processed/transformed shape vectors Pp' of the objects being transformed to processed shape vectors Po' of the objects prescribed in the shape prescribing coordinate systems in the shape vector transforming means by utilizing the transformation affine matrices Mpo stored in the Mop and Mpo matrix storing means, and the processed shape vectors Po' of the objects being stored in the shape vector storing means to replace the shape vectors Po of the objects with the processed shape vectors Po' of the objects; and displaying means for displaying the processed shape vectors Po' of the objects stored in the shape vector storing means.

17. A three-dimensional object movement and transformation processing apparatus for processing a processing object with a robot arm in a three-dimensional space, comprising:

shape storing means for storing a shape of the robot arm prescribed in a first shape prescription coordinate system of the three-dimensional space and a shape of the processing object prescribed in a second shape prescription coordinate system of the three-dimensional space;

Mow matrix storing means for storing a first transformation affine matrix Mrw which transforms the first shape prescription coordinate system prescribing the shape of the robot arm to a world coordinate system of the three-dimensional space and a second transformation affine matrix Msw which transforms the second shape prescription coordinate system prescribing the shape of the processing object to the world coordinate system;

Mwo matrix storing means for storing a third transformation affine matrix Mwr which transforms the world coordinate system to the first shape prescription coordinate system prescribing the shape of the robot arm and a fourth transformation affine matrix Mws which transforms the world coordinate system to the second shape prescription coordinate system prescribing the shape of the processing object;

input means for inputting a piece of movement data designating an amount of movement of the robot arm or the processing object and inputting a piece of inter-object processing data instructing the robot arm to process the processing object;

movement matrix generating means for generating movement matrices indicating the movement of the robot arm or the processing object according to the movement data input to the input means;

affine matrix calculating means for calculating a transformation affine matrix Mrw(new), or Msw(new) relating to the robot arm or the processing object moved according to the movement data by utilizing the movement matrices generated in the movement matrix generating means and the first or second transformation affine matrix Mrw, or Msw stored in the Mow matrix storing means, the transformation affine matrix Mrw(new), or Msw(new) being stored in the Mow matrix storing means to replace the first or second transformation affine matrix Mrw, or Msw with the transformation affine matrix Mrw(new), or Msw(new);

a first inverse matrix calculating apparatus for calculating an inverse matrix Mrw$^{-1}$(new), or Msw$^{-1}$(new) of the transformation affine matrix Mrw(new), or Msw(new) stored in the Mow matrix storing means, the first inverse matrix calculating apparatus comprising first affine matrix dividing means for dividing the transformation affine matrix Mrw(new), or Msw(new) into a minor matrix Q indicating a linear transformation of the robot arm or the processing object and a position vector p indicating a parallel translation of the robot arm or the processing object, inverse matrix calculating means for calculating an inverse matrix $Q^{-1}$ of the minor matrix Q divided in the first affine matrix dividing means, first vector-matrix multiplying means for multiplying the position vector p divided in the first affine matrix dividing means by the inverse matrix $Q^{-1}$ calculated in the inverse matrix calculating means to produce a vector $pQ^{-1}$ and changing a sign of the matrix $pQ^{-1}$ to produce a multiplied vector $-pQ^{-1}$, and first inverse affine matrix arranging means for arranging the inverse matrix $Q^{-1}$ calculated in the inverse matrix calculating means as a minor matrix of the inverse matrix Mrw$^{-1}$(new), or Msw$^{-1}$(new) and arranging the multiplied vector $-pQ^{-1}$ produced in the first vector-matrix multiplying means as a position vector of the inverse matrix Mrw$^{-1}$(new), or Msw$^{-1}$(new) to produce the inverse matrix Mrw$^{-}$1(new), or Msw$^{-1}$(new) having the minor matrix $Q^{-1}$ and the position vector $-pQ^{-1}$, the inverse matrix Mrw$^{-1}$(new), or Msw$^{-1}$(nw) being stored in the Mwo matrix storing means as a transformation affine matrix Mwr(new), or Mws(new) relating to the robot arm or the processing object moved according to the movement data to replace the third or fourth transformation affine matrix Mwr, or Mws stored in the Mwo matrix storing means with the transformation affine matrix Mwr(new), or Mws(new);

a second inverse matrix calculating apparatus for calculating a second inverse matrix $Mrw^{-1}(new)$, or $Msw^{-1}(new)$ of the transformation affine matrix Mrw(new), or Msw(new) stored in the Mow matrix storing means, the second inverse matrix calculating apparatus comprising second affine matrix dividing means for dividing the transformation affine matrix Mrw(new), or Msw(new) into a minor matrix Q indicating a linear transformation of the robot arm or the processing object and a position vector p indicating a parallel translation of the robot arm or the processing object, first transposed matrix calculating means for calculating an transposed matrix $Q^t$ of the minor matrix Q divided in the second affine matrix dividing means, second vector-matrix multiplying means for multiplying the position vector p divided in the second affine matrix dividing means by the transposed matrix $Q^t$ calculated in the first transposed matrix calculating means to produce a vector $pQ^t$ and changing a sign of the matrix $pQ^t$ to produce a multiplied vector $-pQ^t$, and second inverse affine matrix arranging means for arranging the transposed matrix $Q^t$ calculated in the first transposed matrix calculating means as a minor matrix of the second inverse matrix $Mrw^{-1}(new)$, or $Msw^{-1}(new)$ and arranging the multiplied vector $-pQ^t$ produced in the second vector-matrix multiplying means as a position vector of the second inverse matrix $Mrw^{-1}(new)$, or $Msw^{-1}(new)$ to produce the second inverse matrix $Mrw^{-1}(new)$, or $Msw^{-1}(new)$ having the minor matrix $Q^t$ and the position vector $-pQ^t$;

a third inverse matrix calculating apparatus for calculating a third inverse matrix $Mrw^{-1}(new)$, or $Msw^{-1}(new)$ of the transformation affine matrix Mrw(new), or Msw(new) stored in the Mow matrix storing means, the third inverse matrix calculating apparatus comprising third affine matrix dividing means for dividing the transformation affine matrix Mrw(new), or Msw(new) into a minor matrix Q indicating a linear transformation of the robot arm or the processing object and a position vector p indicating a parallel translation of the robot arm or the processing object, second transposed matrix calculating means for calculating an transposed matrix $Q^t$ of the minor matrix Q divided in the third affine matrix dividing means, third vector-matrix multiplying means for multiplying the position vector p divided in the third affine matrix dividing means by the transposed matrix $Q^t$ calculated in the second transposed matrix calculating means to produce a vector $pQ^t$ and changing a sign of the matrix $pQ^t$ to produce a multiplied vector $-pQ^t$, inner product calculating means for calculating a squared product of an absolute value of an axial vector composing the minor matrix Q divided in the third affine matrix dividing means, dividing means for dividing each of components of the transposed matrix $Q^t$ calculated in the second transposed matrix calculating means and each of components of the multiplied vector $-pQ^t$ obtained in the third vector-matrix multiplying means by the squared product calculated in the inner product calculating means, third inverse affine matrix arranging means for arranging the transposed matrix $Q^t$ divided by the squared product in the dividing means as a minor matrix of the third inverse matrix $Mrw^{-1}(new)$, or $Msw^{-1}(new)$ and arranging the multiplied vector $-pQ^t$ divided by the squared product in the dividing means as a position vector of the third inverse matrix $Mrw^{-1}(new)$, or $Msw^{-1}(new)$; and demultiplexing means for transferring the transformation affine matrix Mrw(new), or Msw(new) stored in the Mow matrix storing means to the first inverse matrix calculating apparatus, the second inverse matrix calculating apparatus, or the third inverse matrix calculating apparatus according to the movement data input to the input means, the transformation affine matrix Mrw(new), or Msw(new) being transferred to the second inverse matrix calculating apparatus to send the second inverse matrix $Mrw^{-1}(new)$, or $Msw^{-1}(new)$ arranged in the second inverse affine matrix arranging means to the Mwo matrix storing means as the transformation affine matrix Mwr(new), or Mws(new) in cases where the movement or transformation of the robot arm or the processing object designated by the movement data denotes both the parallel translation indicated by the position vector p and a rotational motion of the robot arm or the processing object, the transformation affine matrix Mrw(new), or Msw(new) being transferred to the third inverse matrix calculating apparatus to send the third inverse matrix $Mrw^{-1}(new)$, or $Msw^{-1}(new)$ arranged in the third inverse affine matrix arranging means to the Mwo matrix storing means as the transformation affine matrix Mwr(new), or Mws(new) in cases where the movement or transformation of the robot arm or the processing object designated by the movement data denotes the parallel translation indicated by the position vector p, a rotational motion of the robot arm or the processing object, and an isotropic magnification or minification of the robot arm or the processing object, and the transformation affine matrix Mrw(new), or Msw(new) being transferred to the first inverse matrix calculating apparatus in other cases to send the inverse matrix $Mrw^{-1}(new)$, or $Msw^{-1}(new)$ arranged in the inverse affine matrix arranging means to the Mwo matrix storing means as the transformation affine matrix Mwr(new), or Mws(new);

inter-object processing means for calculating a transformation affine matrix Msr by utilizing the transformation affine matrix Msw(new), or Msw stored in the Mow matrix storing means and the transformation affine matrix Mwr(new), or Mwr stored in the Mwo matrix storing means, transforming the second shape prescription coordinate system prescribing the shape of the processing object to the first shape prescription coordinate system to determine a position of the processing object in the first shape prescription coordinate system by utilizing the transformation affine matrix Msr, and adopting the position of the processing object in the first shape prescription coordinate system as an amount of movement required of the robot arm to process the processing object;

robot control means for generating a control signal according to the amount of movement adopted in the inter-object processing means to move the robot arm; and robot driving means for moving the robot arm by the amount of movement under control of the control signal generated in the robot control means.

18. A three-dimensional object movement and transformation processing apparatus for processing a processing object with a robot arm in a three-dimensional space, comprising:

shape storing means for storing a shape of the robot arm prescribed in a first shape prescription coordinate system of the three-dimensional space and a shape of the processing object prescribed in a second shape prescription coordinate system of the three-dimensional space;

Mow matrix storing means for storing a first transformation affine matrix Mrw which transforms the first shape prescription coordinate system prescribing the shape of the robot arm to a world coordinate system of the three-dimensional space and a second transformation affine matrix Msw which transforms the second shape prescription coordinate system prescribing the shape of the processing object to the world coordinate system;

Mwo matrix storing means for storing a third transformation affine matrix Mwr which transforms the world coordinate system to the first shape prescription coordinate system prescribing the shape of the robot arm and a fourth transformation affine matrix Mws which transforms the world coordinate system to the second shape prescription coordinate system prescribing the shape of the processing object;

input means for inputting a piece of movement data designating an amount of a parallel translation, a rotational motion and an isotropic magnification or minification of the robot arm or the processing object and inputting a piece of inter-object processing data instructing the robot arm to process the processing object;

movement matrix generating means for generating movement matrices indicating the movement of the robot arm or the processing object according to the movement data input to the input means;

affine matrix calculating means for calculating a transformation affine matrix Mrw(new), or Msw(new) relating to the robot arm or the processing object moved according to the movement data by utilizing the movement matrices generated in the movement matrix generating means and the first or second transformation affine matrix Mrw, or Msw stored in the Mow matrix storing means, the transformation affine matrix Mrw(new), or Msw(new) being stored in the Mow matrix storing means to replace the first or second transformation affine matrix Mrw, or Msw with the transformation affine matrix Mrw(new), or Msw(new);

an inverse matrix calculating apparatus for calculating an inverse matrix $Mrw^{-1}(new)$, or $Msw^{-1}(new)$ of the transformation affine matrix Mrw(new), or Msw(new) stored in the Mow matrix storing means, the inverse matrix calculating apparatus comprising affine matrix dividing means for dividing the transformation affine matrix Mrw(new), or Msw(new) into a minor matrix Q indicating the rotational motion and the isotropic magnification or minification of the robot arm or the processing object and a position vector p indicating the parallel translation of the robot arm or the processing object, transposed matrix calculating means for calculating a transposed matrix $Q^t$ of the minor matrix Q divided in the affine matrix dividing means, vector-matrix multiplying means for multiplying the position vector p divided in the affine matrix dividing means by the transposed matrix $Q^y$ calculated in the transposed matrix calculating means to produce a vector $pQ^t$ and changing a sign of the matrix $pQ^t$ to produce a multiplied vector $pQ^t$, inner product calculating means for calculating a squared product of an absolute value of an axial vector composing the minor matrix Q as a squared rate of the isotropic magnification or minification, dividing means for dividing each of components of the transposed matrix $Q^t$ calculated in the inverse matrix calculating means and each of components of the multiplied vector $pQ^t$ obtained in the vector-matrix multiplying means by the squared product calculated in the inner product calculating means, and inverse affine matrix arranging means for arranging the transposed matrix $Q^t$ divided by the squared product in the dividing means as a minor matrix of the inverse matrix $Mrw^{-1}(new)$, or $Msw^{-1}(new)$ and arranging the multiplied vector $-pQ^t$ divided by the squared product in the dividing means as a position vector of the inverse matrix $Mrw^{-1}(new)$, or $Msw^{-1}(new)$ to produce the inverse matrix $Mrw^{-1}(new)$, or $Msw^{-1}(new)$ having the minor matrix $Q^t$ and the position vector $-pQ^t$, the inverse matrix $Mrw^{-1}(new)$, or $Msw^{-1}(new)$ being stored in the Mwo matrix storing means as a transformation affine matrix Mwr(new), or Mws(new) relating to the robot arm or the processing object moved according to the movement data to replace the third or fourth transformation affine matrix Mwr, or Mws stored in the Mwo matrix storing means with the transformation affine matrix Mwr(new), or Mws(new);

inter-object processing means for calculating a transformation affine matrix Msr by utilizing the transformation affine matrix Msw(new), or Msw stored in the Mow matrix storing means and the transformation affine matrix Mwr(new), or Mwr stored in the Mwo matrix storing means, transforming the second shape prescription coordinate system prescribing the shape of the processing object to the first shape prescription coordinate system to determine a position of the processing object in the first shape prescription coordinate system by utilizing the transformation affine matrix Msr, and adopting the position of the processing object in the first shape prescription coordinate system as an amount of a parallel translation, a rotational motion and an isotropic magnification or minification required of the robot arm to process the processing object;

robot control means for generating a control signal according to the amount of the parallel translation, the rotational motion and the isotropic magnification or minification adopted in the inter-object processing means to move the robot arm; and robot driving means for moving the robot arm by the amount of the parallel translation, the rotational motion and the isotropic magnification or minification under control of the control signal generated in the robot control means.

19. An apparatus according to claim 18, additionally including input processing means for judging whether a piece of input data input to the input means is the movement data or the inter-object processing data, the movement data judged being transferred to the movement matrix generating means, and the inter-object processing data judged being transferred to the inter-object processing means.

* * * * *